US012748801B1

(12) United States Patent
Yi et al.

(10) Patent No.: US 12,748,801 B1
(45) Date of Patent: Sep. 29, 2026

(54) ARTIFICIAL INTELLIGENCE SYSTEM TO CLASSIFY ELECTRONIC DOCUMENTS

(71) Applicant: INTERNATIONAL BUSINESS MACHINES CORPORATION, Armonk, NY (US)

(72) Inventors: Ang Yi, Beijing (CN); Hai Cheng Wang, Beijing (CN); Hong Lin Guo, Beijing (CN); Jing Zhang, Beijing (CN); Dong Rui Li, Beijing (CN); Jun Hong Zhao, ShangDi (CN); Yang Zhong Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/176,277

(22) Filed: Apr. 11, 2025

(51) Int. Cl.
*G06F 16/35* (2025.01)
*G06F 40/106* (2020.01)

(52) U.S. Cl.
CPC ............ *G06F 16/35* (2019.01); *G06F 40/106* (2020.01)

(58) Field of Classification Search
CPC ............................... G06F 16/35; G06F 40/106
See application file for complete search history.

(56) References Cited

U.S. PATENT DOCUMENTS

2016/0092406 A1* 3/2016 Farouki ................. G06F 18/285 715/249
2019/0147103 A1 5/2019 Bhowan et al.
2020/0184267 A1* 6/2020 Kumar ................... G06V 10/82
2020/0210490 A1* 7/2020 Hutchins ............. G06V 30/416
2021/0365502 A1 11/2021 Hutchins
(Continued)

FOREIGN PATENT DOCUMENTS

| | | | |
|---|---|---|---|
| CN | 107918782 | B | 1/2020 |
| CN | 118447520 | A | 8/2024 |
| KR | 10-2077923 | B1 | 2/2020 |

OTHER PUBLICATIONS

Li et al., "Document Type Classification using File Names", arXiv:2410.01166v1 [cs.CL], Oct. 2, 2024, 10 pages.
(Continued)

*Primary Examiner* — Dangelino N Gortayo
(74) *Attorney, Agent, or Firm* — Lily Neff, Esq.; Kevin P. Radigan, Esq.; Heslin Rothenberg Farley & Mesiti P.C.

(57) ABSTRACT

Artificial intelligence-based processing is provided which includes facilitating one or more computer processes by automatically classifying, by an artificial intelligence system, electronic documents. The classifying includes scanning an electronic document to generate electronic document layout data and identifying, via data analysis of the electronic document layout data, document layout features. Further, the classifying includes automatically selecting, based on layout features of a particular document type, one or more document layout features of the identified document layout features, and generating respective electronic feature descriptions for the one or more selected document layout features. Further, the processing includes classifying the electronic document as the particular document type based on exceeding a matching threshold with comparison of the respective electronic feature descriptions to one or more specified electronic feature descriptions for the particular document type.

17 Claims, 15 Drawing Sheets

(56) References Cited

U.S. PATENT DOCUMENTS

| | | | | |
|---|---|---|---|---|
| 2022/0067365 | A1* | 3/2022 | Agrawal .............. | G06V 30/414 |
| 2022/0156300 | A1 | 5/2022 | Paruchuri et al. | |
| 2024/0086468 | A1* | 3/2024 | Wyle .................... | G06N 3/0464 |
| 2024/0411819 | A1* | 12/2024 | Sureshbabu ........... | G06N 20/00 |

OTHER PUBLICATIONS

Paulo Maia, "Classifying text using LLMs", https://nilg.ai/202308/classifying-text-using-llms/, Aug. 29, 2023, 7 pages.

* cited by examiner

INVOICE

BILL OF LADING

UTILITY BILL

ARTIFICIAL INTELLIGENCE SYSTEM TO CLASSIFY ELECTRONIC DOCUMENTS

BACKGROUND

One or more aspects relate, in general, to enhanced computer-based document classification systems and methods, and more particularly, to an artificial intelligence system and method for classification of electronic documents based, in part, on generated natural language descriptions of selected document layout features.

Document classification is a process of categorizing documents into predefined classes or categories based on content. Computer-based document classification supports a variety of computing-based processes, and facilitates management of large amounts of textual data. As one example, batch document classification refers to the process of classifying a set of documents simultaneously, typically in batch mode. For instance, an entity may have a large collection of customer emails and want to categorize or classify the emails into different departments for efficient handling. As another example, online document classification refers to real-time or near real-time classification of individual electronic documents as they arrive, without the need to wait for batch processing. For instance, in one example, an organization's customer support chatbot interacts with users and generates a continuous stream of incoming tickets which need to be categorized. For example, the organization may wish to automatically classify each ticket into relevant categories, such as "technical support", "billing", "product inquiry", etc., to route them to the appropriate support team.

SUMMARY

Shortcomings of the prior art are overcome, and additional advantages are provided herein through the provision of a method which facilitates one or more computer processes by automatically classifying, by an artificial intelligence system, electronic documents. The classifying includes for an electronic document of the electronic documents, scanning, by the artificial intelligence system, the electronic document to generate electronic document layout data, and identifying, via data analysis of the electronic document layout data, document layout features of the electronic document. In addition, the classifying includes automatically selecting, by the artificial intelligence system, based on layout features of a particular document type, one or more document layout features of the identified document layout features of the electronic document, and generating by the artificial intelligence system, respective electronic feature descriptions for the one or more selected document layout features. Further, the classifying includes classifying, by the artificial intelligence system, the electronic document as the particular document type based on exceeding a matching threshold with comparison of the respective electronic feature description to one or more specified electronic feature descriptions for the particular document type.

Computer program products and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the disclosed inventive aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
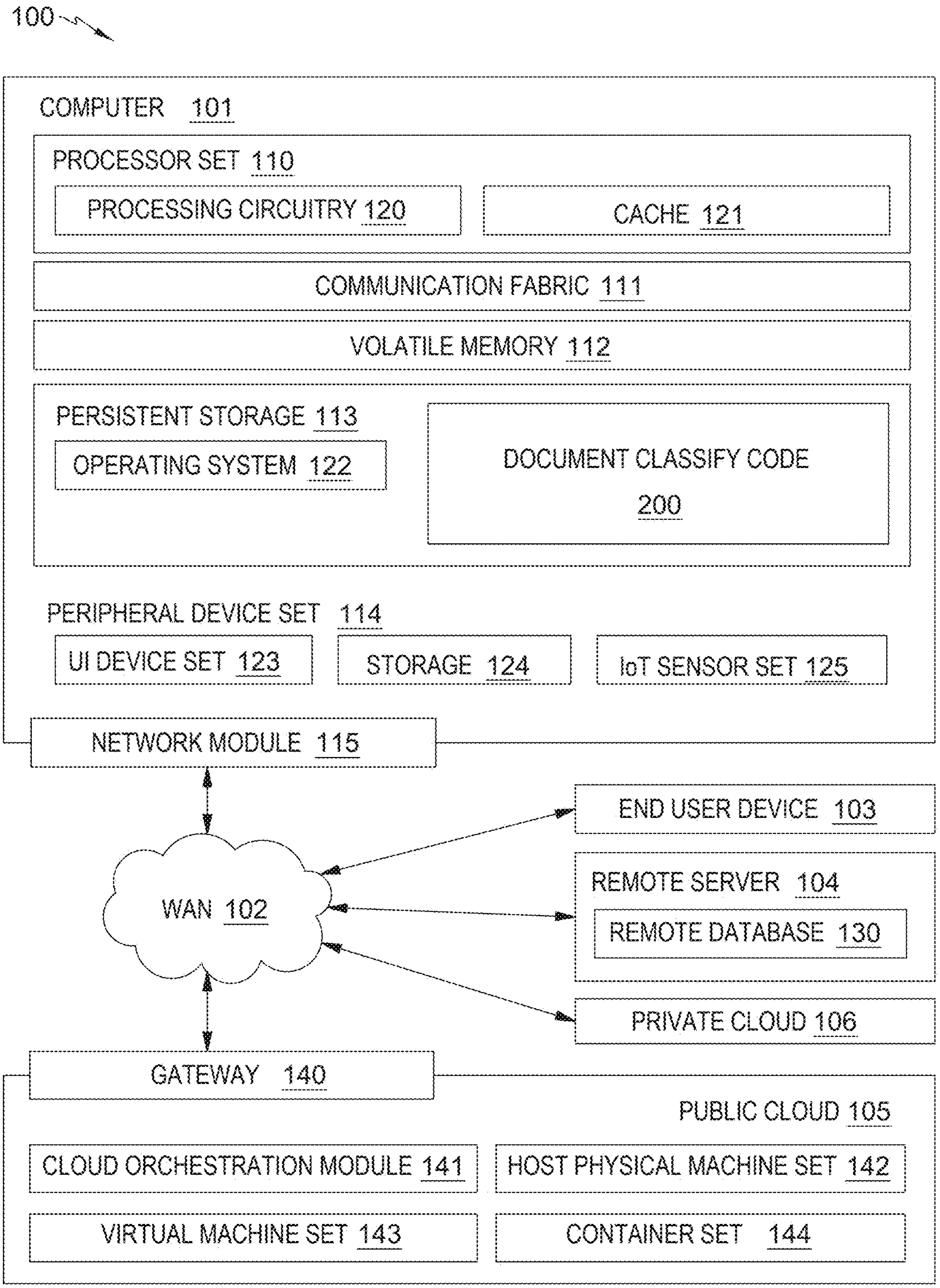
FIG. 1 depicts one example of a computing environment to include and/or use one or more aspects of the present disclosure.

Provided herein, in one or more aspects, is a method which includes facilitating one or more computer processes by automatically classifying, by an artificial intelligence system, electronic documents. The classifying includes, for an electronic document of the electronic documents, scanning, by the artificial intelligence system, the electronic document to generate electronic document layout data, and identifying, via data analysis of the electronic document layout data, document layout features of the electronic document. Further, the classifying includes automatically selecting, by the artificial intelligence system, based on layout features of a particular document type, one or more document features of the identified document layout features of the electronic document, and generating, by the artificial intelligence system, respective electronic descriptions for the one or more selected document layout features. In addition, the classifying includes classifying, by the artificial intelligence system, the electronic document as the particular document type based on exceeding a matching threshold with comparison of the respective electronic feature descriptions to one or more specified electronic feature descriptions for the particular document type. Advantageously, the method enhances document classify processing within a computing environment and accelerates or facilitates one or more computer processes, such as one or more downstream computer processes by automatically, efficiently and effectively classifying electronic documents, such as unstructured electronic documents, for the computer process. In embodiments, the document classify process compares document descriptions, that is, compares the respective electronic feature descriptions generated by the system to one or more prespecified electronic feature descriptions for a particular document type. In this manner, the actual text of the document can be maintained confidential, with no confidential data being used in the process. Further, in one or more embodiments, the document classify process is based on electronic layout feature descriptions that are generated by the system and also on prespecified electronic features descriptions, such as predefined descriptions provided by the system or by the user. The document classify processes disclosed advantageously address the scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process.

Additionally, in one or more embodiments, the method further includes obtaining assigned weights for the layout features of the particular document, and the selecting includes selecting, based on the assigned weights of the layout features of the particular document type and a specified weight threshold, the one or more document layout features of the identified document layout features of the electronic document. Advantageously, by obtaining assigned weights for the layout features of the particular document type, the process includes selecting the one or more document layout features of the electronic document using the assigned weights and a specified weight threshold. In this manner, the document classify processing is accelerated by removing layout features deemed not to have significance for a particular compare operation. For instance, features can be removed (e.g., that do not have any role in the particular classification decision) with reference to the assigned weights for the layout features of the particular document type, and the specified weight threshold. For example, where the assigned weight of a particular feature is below the specified weight threshold, then there is no need to generate the respective electronic feature description for that feature, or to then use the generated feature description in the comparison process, such as disclosed.

Additionally, or alternatively, in one or more embodiments, obtaining assigned weights for the layout features of the particular document type includes assigning a respective weight to a layout feature of the particular document type based, at least in part, on uniqueness of the layout feature to the particular document type. Advantageously, the document classify processing is accelerated by removing layout features deemed not to have significance for a particular compare operation. For instance, features can be removed that do not have a role in the classification decision for a particular document type. By way of example, by assigning the respective weight to a layout feature of the particular document type based, at least in part, on uniqueness of the layout feature to the particular document type, the layout features most significant to the particular document type are identified, which thereby streamlines the selecting of the one or more document layout features of the identified document layout features of the electronic document for generation of the respective electronic feature descriptions.

Additionally, or alternatively, in one or more embodiments, obtaining assigned weights for the layout features of the particular document type includes assigning a respective weight to a layout feature of the particular document type based, at least in part, on frequency of occurrence of the layout feature within the particular document type. Advantageously, the document classify processing is accelerated by removing layout features deemed to have less significance for a particular compare operation. For instance, features can be removed that do not have a role in the classification decision for a particular document type. By way of example, by assigning the respective weight to a layout feature of the particular document type based, at least in part, on frequency of occurrence of the layout feature to the particular document type, the layout features most significant to the particular document type can be identified, which thereby streamlines the selecting of the one or more document layout features of the identified document layout features of the electronic document for generation of the respective electronic feature descriptions.

Additionally, or alternatively, in one or more embodiments, generating, by the artificial intelligence system, the respective electronic feature descriptions for the one or more selected document layout features of the electronic document includes generating, by the artificial intelligence system, respective unstructured electronic feature descriptions for the one or more selected document layout features. Advantageously, by generating the respective electronic feature descriptions for the one or more selected document layout features of the electronic document as respective unstructured electronic feature descriptions, the system generates unstructured text descriptions of the layout features for use in comparison with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system.

Additionally, or alternatively, in one or more embodiments, generating, by the artificial intelligence system, the respective electronic feature descriptions for the one or more selected document layout features includes generating via natural language processing the respective electronic feature descriptions for the one or more selected document layout features of the electronic document. Advantageously, by generating via natural language processing the respective electronic feature descriptions for the one or more selected document layout features of the electronic document, the system generates descriptions of the layout features for use in comparison of the description with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system.

Additionally, or alternatively, in one or more embodiments, the automatically classifying further includes obtaining one or more specified electronic feature descriptions for each document type of one or more document types, the particular document type being one document type of the one or more document types. Advantageously, the document classify process compares document descriptions, that is, compares the respective electronic feature descriptions generated by the system to one or more prespecified electronic feature descriptions for one or more document types. In this manner, the actual text of the document is maintained confidential, with no confidential data needing to be used in the compare process. The document classify processes disclosed applies to scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process.

Additionally, or alternatively, in one or more embodiments, the one or more specified electronic feature descriptions include one or more respective user-defined electronic feature descriptions for each document type of the one or more document types. Advantageously, where the specified electronic feature descriptions are one or more respective user-defined electronic feature descriptions for each document type of the one or more document types, the user can customize the document classification process through the user-provided document layout features descriptions for the different document types. In this manner, the processing can be readily customized for a particular application by the user.

Additionally, or alternatively, in one or more embodiments, the particular document type includes one document type of multiple document types, and the method further includes repeating the selecting, the generating and the classifying for another document type of the multiple document types where the comparison of the respective electronic feature descriptions to the one or more specified electronic feature descriptions for the particular document type does not exceed the matching threshold, and where classifying, by the artificial intelligence system, the electronic document as the other document type is based on exceeding the matching threshold with comparison of other generated respective electronic feature descriptions for one or more other selected document layout features, to one or more other specified electronic feature descriptions of the other document type. Advantageously, the artificial intelligence system document classification process improves productivity, lowers resource consumption and supports classifying of confidential documents by repeating the selecting, the generating and the classifying of the electronic document using comparison of the different generated respective electronic feature descriptions to the corresponding one or more specified electronic feature descriptions of each particular document type.

In accordance with one or more aspects, each of the above-noted method embodiments is separable and optional from one another. Further, the above-noted method embodiments can be combined with one another.

In one or more other aspects, a computer program product is provided. The computer program product includes one or more computer-readable storage media and program instructions stored on the one or more computer-readable storage media to perform operations. The operations include facilitating one or more computer processes by automatically classifying, by an artificial intelligence system, electronic documents. The classifying includes for an electronic document of the electronic documents, scanning, by the artificial intelligence system, the electronic document to generate electronic document layout data and identifying, via data analysis of the electronic document layout data, document layout features of the electronic document. Further, the classifying includes automatically selecting, by the artificial intelligence system, based on layout features of a particular document type, one or more document layout features of the identified document layout features of the electronic document, and generating, by the artificial intelligence system, respective electronic feature descriptions for the one or more selected document layout features. Further, the classifying includes classifying, by the artificial intelligence system, the electronic document as the particular document type based on exceeding a matching threshold with comparison of the respective electronic feature descriptions to one or more specified electronic feature descriptions for the particular document type. Advantageously, the method enhances document classify processing within a computing environment and accelerates or facilitates one or more computer processes, such as one or more downstream computer processes by automatically, efficiently and effectively classifying electronic documents, such as unstructured electronic documents, for the computer process. In embodiments, the document classify process compares document descriptions, that is, compares the respective electronic feature descriptions generated by the system to one or more prespecified electronic feature descriptions for a particular document type. In this manner, the actual text of the document can be maintained confidential, with no confidential data being used in the process. Further, in one or more embodiments, the document classify process is based on electronic layout feature descriptions that are generated by the system and also on prespecified electronic features descriptions, such as predefined descriptions provided by the system or by the user. The document classify processes disclosed advantageously address the scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process.

Additionally, in one or more computer program product embodiments, the operations further include obtaining assigned weights for the layout features of the particular document type, and the selecting includes selecting, based on the assigned weights of the layout features of the particular type and specified weight threshold, the one or more document layout features of the identified document layout features of the electronic document. Advantageously, by obtaining assigned weights for the layout features of the particular document type, the process includes selecting the one or more document layout features of the electronic document using the assigned weights and a specified weight threshold. In this manner, the document classify processing is accelerated by removing layout features deemed not to have significance for a particular compare operation. For instance, features can be removed (e.g., that do not have any role in the particular classification decision) with reference to the assigned weights for the layout features of the particular document type, and the specified weight threshold. For example, where the assigned weight of a particular feature is below the specified weight threshold, then there is no need to generate the respective electronic feature description for that feature, or to then use the generated feature description in the comparison process, such as disclosed.

Additionally, or alternatively, in one or more computer program product embodiments, generating, by the artificial intelligence system, the respective electronic feature descriptions for the one or more selected document layout features of the electronic document includes generating, by the artificial intelligence system, respective unstructured electronic feature descriptions for the one or more selected document layout features. Advantageously, by generating the respective electronic feature descriptions for the one or more selected document layout features of the electronic document as respective unstructured electronic feature descriptions, the system generates unstructured text descriptions of the layout features for use in comparison with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system.

Additionally, or alternatively, in one or more computer program product embodiments, generating, by the artificial intelligence system, the respective unstructured electronic feature descriptions for the one or more selected document layout features includes generating via natural language processing the respective unstructured electronic feature descriptions for the one or more selected document layout features of the electronic document. Advantageously, by generating via natural language processing the respective electronic feature descriptions for the one or more selected document layout features of the electronic document, the system generates descriptions of the layout features for use in comparison of the description with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system.

Additionally, or alternatively, in one or more computer program product embodiments, the classifying further includes obtaining one or more specified electronic feature descriptions for each document type of one or more document types, where the particular document type is one document type of the one or more document types. Advantageously, the document classify process compares document descriptions, that is, compares the respective electronic feature descriptions generated by the system to one or more prespecified electronic feature descriptions for one or more document types. In this manner, the actual text of the document is maintained confidential, with no confidential data needing to be used in the compare process. The document classify processes disclosed applies to scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process.

Additionally, or alternatively, in one or more computer program product embodiments, the one or more specified electronic feature descriptions include one or more respective user-defined electronic feature descriptions for each document type of the one or more document types. Advantageously, where the specified electronic feature descriptions are one or more respective user-defined electronic feature descriptions for each document type of the one or more document types, the user can customize the document classification process through the user-provided document layout features descriptions for the different document types. In this manner, the processing can be readily customized for a particular application by the user.

Additionally, or alternatively, in one or more computer program product embodiments, the particular document type includes one document type of multiple document types, and the operations further include repeating the selecting, the generating and the classifying for another document type of the multiple document types where the comparison of the respective electronic feature descriptions to the one or more specified electronic feature descriptions for the particular document type does not exceed the matching threshold, and where classifying, by the artificial intelligence system, the electronic document as the other document type is based on exceeding the matching threshold with comparison of other generated respective electronic feature descriptions, for the one or more other selected document layout features, to one or more other specified electronic feature descriptions of the other document type. Advantageously, the artificial intelligence system document classification process improves productivity, lowers resource consumption and supports classifying of confidential documents by repeating the selecting, the generating and the classifying of the electronic document using comparison of the different generated respective electronic feature descriptions to the corresponding one or more specified electronic feature descriptions of each particular document type.

In accordance with one or more aspects, each of the above-noted computer program product embodiments is separable and optional from one another. Further, the above-noted computer program product embodiments can be combined with one another.

In one or more further aspects, a computer system is provided which includes a processor set, one or more computer-readable storage media, and program instructions stored on the one or more computer-readable storage media to cause the processor set to perform operations. The operations include facilitating one or more computer processes by automatically classifying, by an artificial intelligence system, electronic documents. The classifying includes, for an electronic document of the electronic documents, scanning, by the artificial intelligence system, the electronic document to generate electronic document layout data, and identifying, via data analysis of the electronic document layout data, document layout features of the electronic document. Further, the classifying includes automatically selecting, by the artificial intelligence system based on layout features of a particular document type, one or more document layout features of the identified document layout features of the electronic document, and generating, by the artificial intelligence system, respective electronic feature descriptions for the one or more selected document layout features. Further, the automatically classifying includes classifying, by the artificial intelligence system, the electronic document as the particular document type based on exceeding a matching threshold with comparison of the respective electronic feature descriptions to one or more specified electronic feature descriptions for the particular document type. Advantageously, the system enhances document classify processing within a computing environment and accelerates or facilitates one or more computer processes, such as one or more downstream computer processes by automatically, efficiently and effectively classifying electronic documents, such as unstructured electronic documents, for the computer process. In embodiments, the document classify process compares document descriptions, that is, compares the respective electronic feature descriptions generated by the system to one or more prespecified electronic feature descriptions for a particular document type. In this manner, the actual text of the document can be maintained confidential, with no confidential data being used in the process. Further, in one or more embodiments, the document classify process is based on electronic layout feature descriptions that are generated by the system and also on prespecified electronic features descriptions, such as predefined descriptions provided by the system or by the user. The document classify processes disclosed advantageously address the scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process.

Additionally, in one or more computer system embodiments, the operations further includes obtaining assigned weights for the layout features of the particular document type, and the selecting includes selecting, based on the assigned weights of the layout features of the particular document type and based on a specified weight threshold, the one or more document layout features of the identified document features of the electronic document. Advantageously, by obtaining assigned weights for the layout features of the particular document type, the process includes selecting the one or more document layout features of the electronic document using the assigned weights and a specified weight threshold. In this manner, the document classify processing is accelerated by removing layout features deemed not to have significance for a particular compare operation. For instance, features can be removed (e.g., that do not have any role in the particular classification decision) with reference to the assigned weights for the layout features of the particular document type, and the specified weight threshold. For example, where the assigned weight of a particular feature is below the specified weight threshold, then there is no need to generate the respective electronic feature description for that feature, or to then use the generated feature description in the comparison process, such as disclosed.

Additionally, or alternatively, in one or more computer system embodiments, generating, by the artificial intelligence system, the respective electronic feature descriptions for the one or more selected document layout features of an electronic document includes generating, by the artificial intelligence system, respective unstructured electronic feature descriptions for the one or more selected document layout features. Advantageously, by generating the respective electronic feature descriptions for the one or more selected document layout features of the electronic document as respective unstructured electronic feature descriptions, the system generates unstructured text descriptions of the layout features for use in comparison with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system.

Additionally, or alternatively, in one or more computer system embodiments, generating, by the artificial intelligence system, the respective unstructured electronic feature descriptions for the one or more selected document layout features includes generating via natural language processing the respective electronic feature descriptions for the one or more selected document layout features of the electronic document. Advantageously, by generating via natural language processing the respective electronic feature descriptions for the one or more selected document layout features of the electronic document, the system generates descriptions of the layout features for use in comparison of the description with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system.

In accordance with one or more aspects, each of the above-noted computer system embodiments is separable and optional from one another. Further, the above-noted computer system embodiments can be combined with one another.

In accordance with one or more further aspects, a method is provided which includes facilitating one or more computer processes by automatically classifying, by an artificial intelligence system, electronic documents. The classifying includes, for an electronic document of the electronic documents, scanning, by the artificial intelligence system, the electronic document to generate electronic document layout data, and identifying, via data analysis of the electronic document layout data, document layout features of the electronic document. Further, the classifying includes automatically selecting, by the artificial intelligence system, based on layout features of a particular document type, one or more document features of the identified document layout features of the electronic document, and generating, by the artificial intelligence system, respective electronic descriptions for the one or more selected document layout features.

In addition, the classifying includes classifying, by the artificial intelligence system, the electronic document as the particular document type based on exceeding a matching threshold with comparison of the respective electronic feature descriptions to one or more specified electronic feature descriptions for the particular document type. Further, the method includes obtaining assigned weights for layout features of a particular document type, and the selecting includes selecting, by the assigned weights of the layout feature of the particular document type and a specified weight threshold, the one or more document layout features of the identified document layout features of the electronic document. In embodiments, generating, by the artificial intelligence system, the respective electronic feature descriptions for the one or more selected document layout features includes generating, via natural language processing respective unstructured electronic feature descriptions for the one or more selected document layout features. Advantageously, the method enhances document classify processing within a computing environment and accelerates or facilitates one or more computer processes, such as one or more downstream computer processes by automatically, efficiently and effectively classifying electronic documents, such as unstructured electronic documents, for the computer process. In embodiments, the document classify process compares document descriptions, that is, compares the respective electronic feature descriptions generated by the system to one or more prespecified electronic feature descriptions for a particular document type. In this manner, the actual text of the document can be maintained confidential, with no confidential data being used in the process. Further, in one or more embodiments, the document classify process is based on electronic layout feature descriptions that are generated by the system and also on prespecified electronic features descriptions, such as predefined descriptions provided by the system or by the user. The document classify processes disclosed advantageously address the scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process. In addition, by obtaining assigned weights for the layout features of the particular document type, the process includes selecting the one or more document layout features of the electronic document using the assigned weights and a specified weight threshold. In this manner, the document classify processing is accelerated by removing layout features deemed not to have significance for a particular compare operation. For instance, features can be removed (e.g., that do not have any role in the particular classification decision) with reference to the assigned weights for the layout features of the particular document type, and the specified weight threshold. For example, where the assigned weight of a particular feature is below the specified weight threshold, then there is no need to generate the respective electronic feature description for that feature, or to then use the generated feature description in the comparison process, such as disclosed. Further, by generating the respective electronic feature descriptions for the one or more selected document layout features of the electronic document as respective unstructured electronic feature descriptions, the system generates unstructured text descriptions of the layout features for use in comparison of the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system. Further, by generating via natural language processing the respective electronic feature descriptions for the one or more selected document layout features of the electronic document, the system generates descriptions of the layout features for use in comparison of the description with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system.

In accordance with one or more further aspects, a method is provided which includes facilitating one or more computer processes by automatically classifying, by an artificial intelligence system, electronic documents. The classifying includes, for an electronic document of the electronic documents, scanning, by the artificial intelligence system, the electronic document to generate electronic document layout data, and identifying, via data analysis of the electronic document layout data, document layout features of the electronic document. Further, the classifying includes automatically selecting, by the artificial intelligence system, based on layout features of a particular document type, one or more document features of the identified document layout features of the electronic document, and generating, by the artificial intelligence system, respective electronic descriptions for the one or more selected document layout features. In addition, the classifying includes classifying, by the artificial intelligence system, the electronic document as the particular document type based on exceeding a matching threshold with comparison of the respective electronic feature descriptions to one or more specified electronic feature descriptions for the particular document type. Further, the method includes obtaining assigned weights for layout features of a particular document type, and the selecting includes selecting, by the assigned weights of the layout feature of the particular document type and a specified weight threshold, the one or more document layout features of the identified document layout features of the electronic document. In embodiments, generating, by the artificial intelligence system, the respective electronic feature descriptions for the one or more selected document layout features includes generating, via natural language processing respective unstructured electronic feature descriptions for the one or more selected document layout features. Further, in embodiments, the one or more specified electronic feature descriptions are one or more respective user-defined electronic feature descriptions for the particular document type. Advantageously, the method enhances document classify processing within a computing environment and accelerates or facilitates one or more computer processes, such as one or more downstream computer processes by automatically, efficiently and effectively classifying electronic documents, such as unstructured electronic documents, for the computer process. In embodiments, the document classify process compares document descriptions, that is, compares the respective electronic feature descriptions generated by the system to one or more prespecified electronic feature descriptions for a particular document type. In this manner, the actual text of the document can be maintained confidential, with no confidential data being used in the process. Further, in one or more embodiments, the document classify process is based on electronic layout feature descriptions that are generated by the system and also on prespecified electronic features descriptions, such as predefined descriptions provided by the system or by the user. The document classify processes disclosed advantageously address the scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process. In addition, by obtaining assigned weights for the layout features of the particular document type, the process includes selecting the one or more document layout features of the electronic document using the assigned weights and a specified weight threshold. In this manner, the document classify processing is accelerated by removing layout features deemed not to have significance for a particular compare operation. For instance, features can be removed (e.g., that do not have any role in the particular classification decision) with reference to the assigned weights for the layout features of the particular document type, and the specified weight threshold. For example, where the assigned weight of a particular feature is below the specified weight threshold, then there is no need to generate the respective electronic feature description for that feature, or to then use the generated feature description in the comparison process, such as disclosed. Further, by generating the respective electronic feature descriptions for the one or more selected document layout features of the electronic document as respective unstructured electronic feature descriptions, the system generates unstructured text descriptions of the layout features for use in comparison with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system. Further, by generating via natural language processing the respective electronic feature descriptions for the one or more selected document layout features of the electronic document, the system generates descriptions of the layout features for use in comparison of the description with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system. In addition, where the specified electronic feature descriptions are one or more respective user-defined electronic feature descriptions for each document type of the one or more document types, the user can customize the document classification process through the user-provided document layout features descriptions for the different document types. In this manner, the processing can be readily customized for a particular application by the user.

In accordance with one or more aspects, a method is provided which includes facilitating one or more computer processes by automatically classifying, by an artificial intelligence system, electronic documents. The classifying includes, for an electronic document of the electronic documents, scanning, by the artificial intelligence system, the electronic document to generate electronic document layout data, and identifying, via data analysis of the electronic document layout data, document layout features of the electronic document. Further, the classifying includes automatically selecting, by the artificial intelligence system, based on layout features of a particular document type, one or more document features of the identified document layout features of the electronic document, and generating, by the artificial intelligence system, respective electronic descriptions for the one or more selected document layout features. In addition, the classifying includes classifying, by the artificial intelligence system, the electronic document as the particular document type based on exceeding a matching threshold with comparison of the respective electronic feature descriptions to one or more specified electronic feature descriptions for the particular document type. Further, the method includes obtaining assigned weights for layout features of a particular document type, and the selecting includes selecting, by the assigned weights of the layout feature of the particular document type and a specified weight threshold, the one or more document layout features of the identified document layout features of the electronic document. In embodiments, generating, by the artificial intelligence system, the respective electronic feature descriptions for the one or more selected document layout features includes generating, via natural language processing respective unstructured electronic feature descriptions for the one or more selected document layout features. Further, in embodiments, the particular document type is one document type of multiple document types, and the method further includes repeating the selecting, the generating and the classifying for another document type of the multiple document types where the comparison of the respective electronic feature descriptions to the one or more specified electronic feature descriptions for the particular document type does not exceed the matching threshold, and where the classifying, by the artificial intelligence system, the electronic document is the other document type is based on exceeding the matching threshold with comparison of other generated respective electronic feature descriptions, for one or more other selected document layout features, to one or more other specified electronic feature descriptions of the other document type. Advantageously, the method enhances document classify processing within a computing environment and accelerates or facilitates one or more computer processes, such as one or more downstream computer processes by automatically, efficiently and effectively classifying electronic documents, such as unstructured electronic documents, for the computer process. In embodiments, the document classify process compares document descriptions, that is, compares the respective electronic feature descriptions generated by the system to one or more prespecified electronic feature descriptions for a particular document type. In this manner, the actual text of the document can be maintained confidential, with no confidential data being used in the process. Further, in one or more embodiments, the document classify process is based on electronic layout feature descriptions that are generated by the system and also on prespecified electronic features descriptions, such as predefined descriptions provided by the system or by the user. The document classify processes disclosed advantageously address the scenarios where training or fine tuning of a machine learning model is not possible due to the sample documents not being available, or due to the confidential nature of the documents, or other reasons. The document classify process disclosed supports classifying of confidential documents, and improves productivity and lowers resource consumption to accomplish the classification process. In addition, by obtaining assigned weights for the layout features of the particular document type, the process includes selecting the one or more document layout features of the electronic document using the assigned weights and a specified weight threshold. In this manner, the document classify processing is accelerated by removing layout features deemed not to have significance for a particular compare operation. For instance, features can be removed (e.g., that do not have any role in the particular classification decision) with reference to the assigned weights for the layout features of the particular document type, and the specified weight threshold. For example, where the assigned weight of a particular feature is below the specified weight threshold, then there is no need to generate the respective electronic feature description for that feature, or to then use the generated feature description in the comparison process, such as disclosed. Further, by generating the respective electronic feature descriptions for the one or more selected document layout features of the electronic document as respective unstructured electronic feature descriptions, the system generates unstructured text descriptions of the layout features for use in comparison with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system. Further, by generating via natural language processing the respective electronic feature descriptions for the one or more selected document layout features of the electronic document, the system generates descriptions of the layout features for use in comparison of the description with the one or more specified electronic feature descriptions of the particular document type to determine whether the electronic document is of the particular document type. In this manner, content of the document is not required for the comparison process, and the actual document content is not needed in order to complete the classification process. Also, in this manner, the document classify process supports, for instance, classifying of confidential documents by the artificial intelligence system. In addition, the artificial intelligence system document classification process improves productivity, lowers resource consumption and supports classifying of confidential documents by repeating the selecting, the generating and the classifying of the electronic document using comparison of the different generated respective electronic feature descriptions to the corresponding one or more specified electronic feature descriptions of each particular document type.

Methods, computer program products and computer systems relating to one or more aspects are described and claimed herein. Each of the embodiments of the methods can be embodiments of a computer program product and/or a computer system, and vice versa. Further, each of the embodiments are separable and optional from one another. Moreover, embodiments can be combined with one another. Each of the method embodiments can be combined with aspects and/or embodiments of one or more of the computer program products and/or computer systems, and vice versa.

Aspects of the present disclosure and certain features, advantages, and details thereof, are explained more fully below with reference to the non-limiting example(s) illustrated in the accompanying drawings. Descriptions of well-known software, systems, devices, processing techniques, tools, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, where the same or similar reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Note that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, tools, engines, etc. One or more aspects of an illustrative embodiment can be implemented in software, hardware, or a combination thereof.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as code, or one or more programs, are depicted in FIG. 1, including operating system 122 and document classify code 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one or more processor sets, each with one processor or multiple processors, and/or any other type of environment and/or configuration, etc., that is capable of executing a process (or multiple processes) that, e.g., perform processing, such as disclosed herein. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As illustrated in FIG. 1, computing environment 100 contains an example of an environment for the execution of at least some of the computer code involved in performing the inventive methods, such as document classify code 200. In addition to code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in document classify code 200 includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2A:
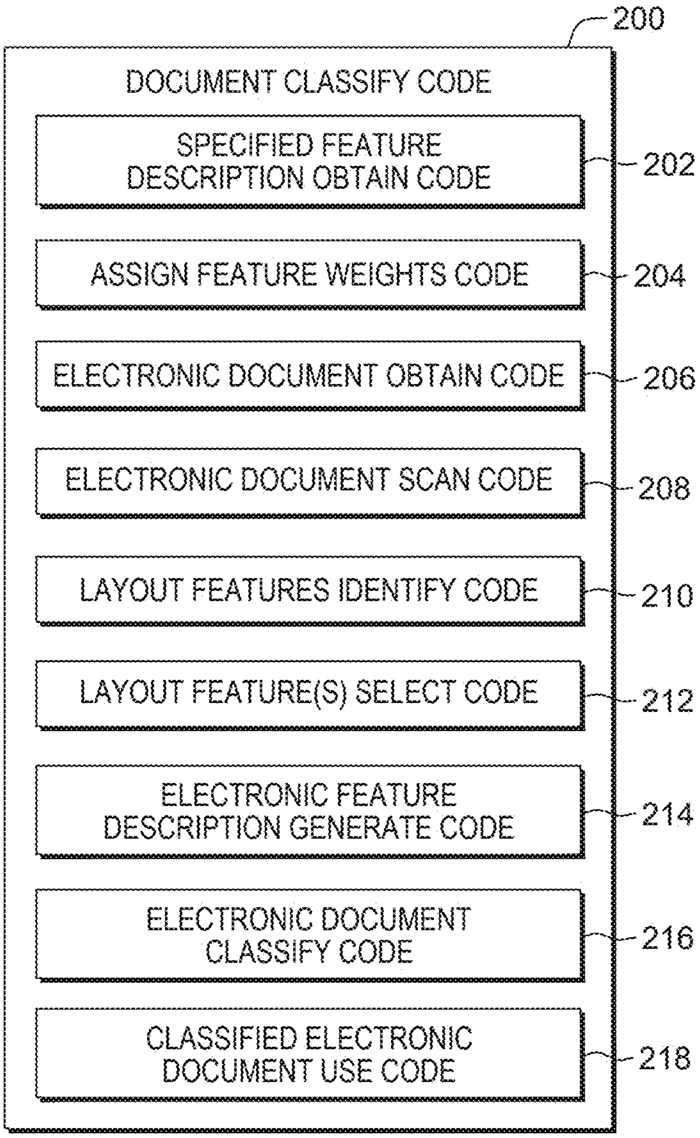
FIG. 2A depicts one embodiment of a computer program product with document classify code, in accordance with one or more aspects of the present disclosure.
Figure 2B:
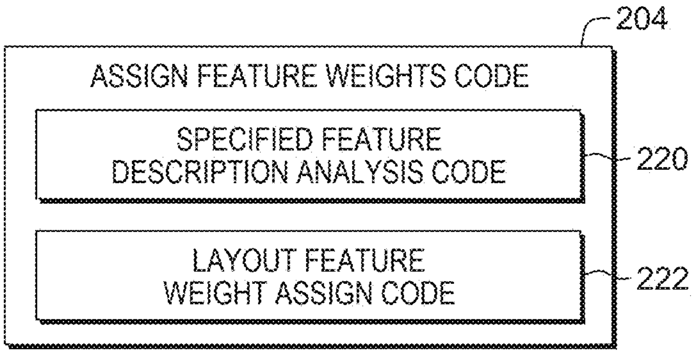
FIG. 2B depicts one embodiment of an assign feature weights code for a document classify code, such as for the document classify code of FIG. 2A, in accordance with one or more aspects of the present disclosure.
Figure 2C:
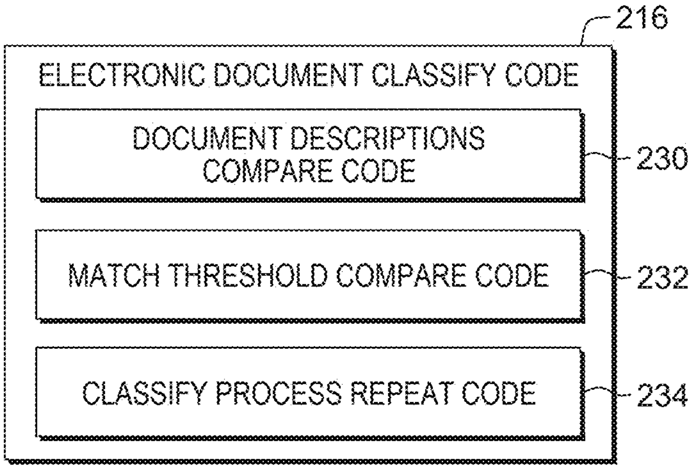
FIG. 2C depict one embodiment of an electronic document classify code for a document classify code, such as for the document classify code of FIG. 2A, in accordance with one or more aspects of the present disclosure.
Figure 3A:
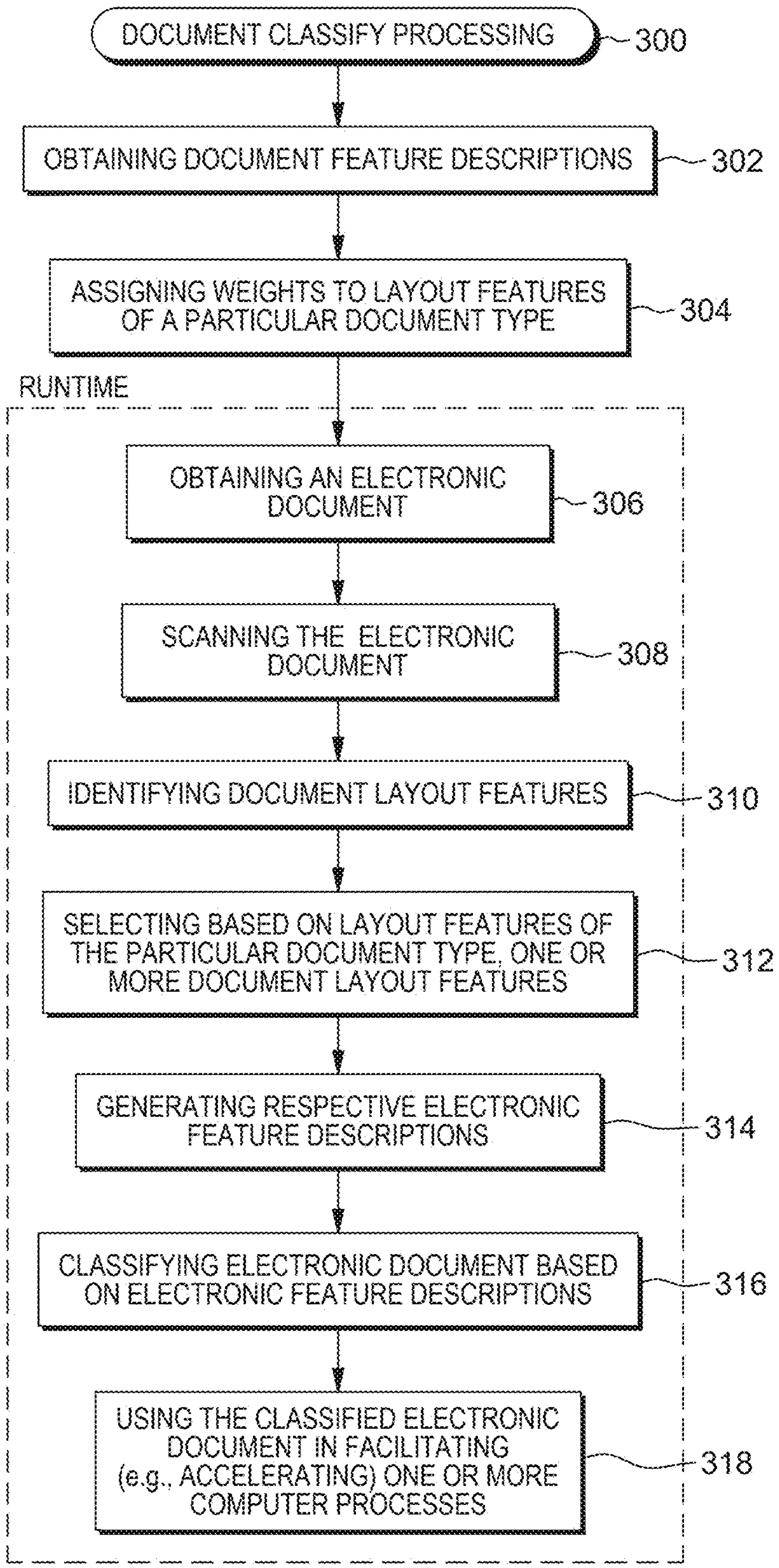
FIG. 3A depicts one embodiment of document classify processing, in accordance with one or more aspects of the present disclosure.
Figure 3B:
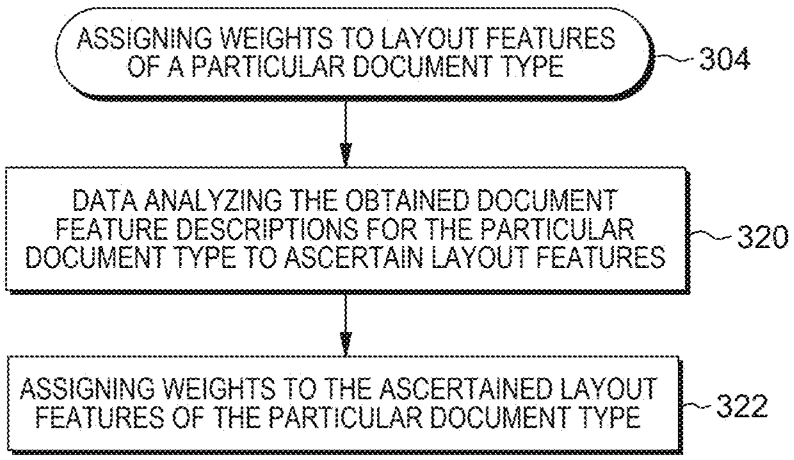
FIG. 3B depicts one embodiment of an assigning weights to layout features of a particular document type process, such as the assigning weights to layout features process of FIG. 3A, in accordance with one or more aspects of the present disclosure.
Figure 3C:
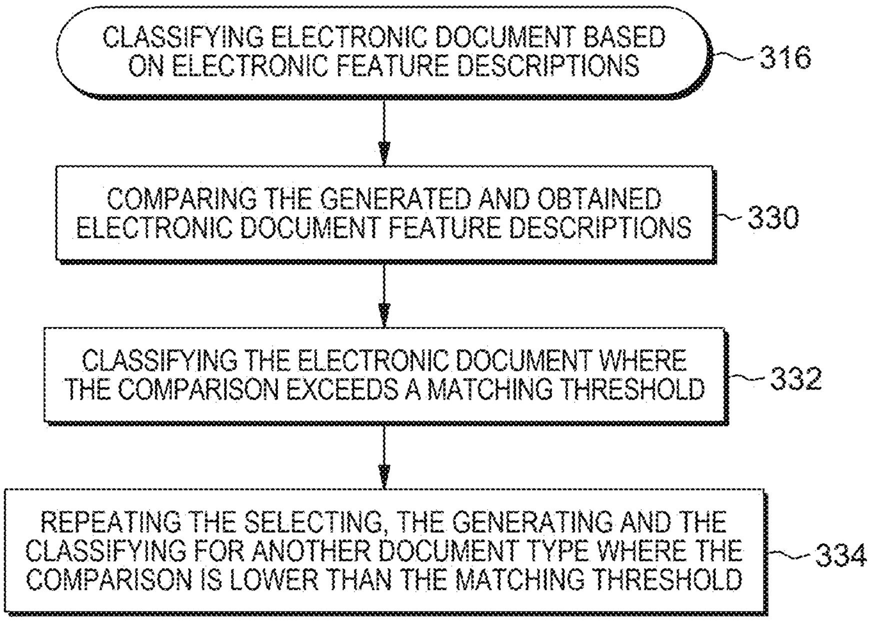
FIG. 3C depicts one embodiment of a classifying electronic document based on electronic feature descriptions process, such as the classifying electronic document based on electronic feature descriptions process of FIG. 3A, in accordance with one or more aspects of the present disclosure.

By way of example, embodiments of document classify code and document classify process workflows are described initially with reference to FIGS. 2A-3C. FIGS. 2A-2C depict embodiments of document classify code 200 that includes code or instructions (e.g., of one or more artificial intelligence systems) to perform document classify processing, in accordance with one or more aspects of the present disclosure, and FIGS. 3A-3C depict embodiments of document classify process workflows, in accordance with one or more aspects of present disclosure.

Referring to FIGS. 1-2C, document classify code 200 includes, in one example, various code or sub-modules used to perform processing, in accordance with one or more aspects of present disclosure. The sub-modules are, e.g., computer-readable program code (e.g., instructions) in computer-readable media (e.g. persistent storage 113, such as a disk) and/or cache (e.g., cache 121) as examples). The computer-readable media can be part of one or more computer program products and can be executed by and/or using one or more computers, such as computer(s) 101 (FIG. 1), and/or one or more artificial intelligence (AI) systems (e.g., artificial intelligence system 401 (FIG. 4A)), etc.; one or more processor sets 110 (FIG. 1); processors, such as one or more processors of processor set 110; and/or processing circuitry, such as processing circuitry of processor set 110, etc.

As noted, FIG. 2A-2C depict embodiments of document classify code 200 which, in one or more implementations, facilitates or accelerates, one or more computer processes of a computing environment, in accordance with one or more aspects of present disclosure. As depicted in FIG. 2A, in one or more embodiments, document classify code 200 includes specified feature description obtain code 202 to obtain one or more specified electronic feature descriptions for one or more features of a particular document type. In one or more embodiments, one or more document types can be specified or defined (e.g., by the artificial intelligence system, or a user of the system, etc.), each with one or more respective specified electronic feature descriptions of the document type being obtained, such as one or more natural language layout feature descriptions. For instance, in one or more embodiments, the specified feature description obtain code 202 includes code to prompt for, to retrieve, and/or to receive, the one or more specified electronic feature descriptions for each document type of the one or more document types. As noted, in one embodiment, the specified electronic feature descriptions can be provided, for instance, by a user or a using entity of the artificial intelligence-based document classify process. Note that as used herein "electronic document" can be any of a variety of types of electronic documents for which classification is desired to, for instance, enhance, facilitate or accelerate one or more computer processes of a computing environment. As described herein, in one or more embodiments, the document classify code and process are implemented by, or within, an artificial intelligence system.

As illustrated in FIG. 2A, document classify code 200 further includes assign feature weights code 204 to assign weights to the specified layout features of the particular document type. FIG. 2B depicts one embodiment of assign feature weights code 204. As illustrated, in one or more embodiments, assign feature weights code 204 includes specified feature description analysis code 220 to data analyze, by the artificial intelligence system, one or more specified electronic feature descriptions of the particular document type. Further, assign feature weights code 204 includes, in one or more embodiments, layout feature weight assign code 222 to assign respective weights to layout features of the particular document type. For instance, in one embodiment, layout feature weight assign code 222 assigns a respective weight to a layout feature of a particular document type based, at least in part, on significance or importance of the feature to identifying the document type, such as uniqueness of the layout feature to the particular document type, frequency of occurrence of the layout feature within the particular document type, etc.

As illustrated in FIG. 2A, document classify code 200 further includes, in one or more embodiments, electronic document obtain code 206 to obtain one or more electronic documents to undergo document classify processing such as disclosed herein, and electronic document scan code 208 to scan, by the artificial intelligence system, an electronic document to generate electronic document layout data, such as disclosed herein. Further, in one or more embodiments, document classify code 200 includes layout features identify code 210 to identify, via artificial intelligence system data analysis of the electronic document layout data, document layout features of the electronic document, such as disclosed herein, and layout feature(s) select code 212 to select, by the artificial intelligence system, based on corresponding layout features of a particular document type, one or more document layout features of the identified document layout features of the electronic document. For instance, in one or more embodiments, the layout feature(s) select code 212 when executing, obtains assigned weights for layout features of the particular document type, and selects, based on the assigned weights of the layout features of the particular document type and based on a specified weight threshold, the one or more document layout features of the identified document layout features of the electronic document for further processing. In this manner, processing overhead is reduced by focusing the subsequent document classification workflow on the selected one or more document layout features based on the specified weight threshold (e.g., by focusing the processing on the more significant layout features for the particular document type). Note that, in one or more embodiments, the specified weight threshold can be system-adjustable or user-adjustable, for instance, based on obtained results of the classification process and/or obtained results of one or more computer processes being facilitated or accelerated by the document classify process.

In one or more embodiments, document classify code 200 further includes electronic feature description generate code 214 to generate, by the artificial intelligence system, respective electronic feature descriptions for the one or more selected document layout features. For instance, in one or more embodiments, respective unstructured electronic feature natural language descriptions are generated by the artificial intelligence system for the one or more selected document layout features, such as, for instance, via natural language processing (NLP) and/or large language model (LLM) processing. As understood, natural language processing (NLP) is an artificial intelligence-based process that enables computers to understand, interpret, and generate natural language. Further, large language models (LLM) are a type of artificial intelligence (AI) model that leverages deep learning techniques to perform, for instance, NLP tasks, particularly those involving language generation and understanding. Large language models are trained on large data sets of texts and code to learn patterns and relationships in human natural language.

As illustrated in FIG. 2A, document classify code 200 further includes, in one or more embodiments, electronic document classify code 216 to classify (or categorize), by the artificial intelligence system, the electronic document as the particular document type based on exceeding a matching threshold with comparison of the respective electronic feature descriptions to one or more specified electronic feature descriptions for the particular document type. FIG. 2C depicts one embodiment of electronic document classify code 216. As illustrated in FIG. 2C, in one embodiment, electronic document classify code 216 includes document descriptions compare code 230 to compare, for instance, the generated respective electronic feature descriptions to the obtained one or more specified electronic feature descriptions for the particular document type. For instance, in one or more embodiments, the comparison of the generated respective electronic feature descriptions to the obtained one or more specified electronic feature descriptions for the particular document type can be performed by the artificial intelligence system via, for instance, natural language processing and/or large language model processing using, for instance, generated or provided compare instructions, such as via a compare template, one example of which is described below in connection with FIG. 9. For instance, both natural language processing and large language model processing techniques offer several ways to assess textual similarity. For example, in one approach, cosine similarity can be used to compare different representations of the text as vectors. The closer the vectors, the higher the cosine similarity score, thereby indicating greater textual similarity.

As illustrated in FIG. 2C, in one or more embodiments, electronic document classify code 216 includes match threshold compare code 232 configured to determine, when executing, whether the description comparison provides a matching result that exceeds a defined matching threshold. In one or more embodiments, the matching threshold can be set by the artificial intelligence system based on model training, and/or can be user-programmable or user-adjustable, for instance, based on obtained results of the classification process and/or obtained results of the one or more computer processes being facilitated or accelerated. In one or more embodiments, electronic document classify code 216 further includes classify repeat code 234 to, for instance, repeat the selecting, the generating, the classifying for another document type of multiple document types where the comparison of the respective electronic feature descriptions to the one or more specified electronic feature descriptions for the particular document type does not exceed the matching threshold. Note that, in this regard, classifying, by the artificial intelligence system, the electronic document as the other document type is based on exceeding the matching threshold with comparison of other generated respective electronic feature descriptions (tailored by the selecting based on the other document type) to obtained one or more other specified electronic features descriptions for the other document type.

As illustrated in FIG. 2A, in one or more embodiments, document classify code 200 further includes classified electronic document use code 218 to, for instance, initiate, or facilitate using the classified electronic document in one or more computer processes, such as one or more downstream computer processes, where the classified electronic document accelerates or enhances the one or more computer processes. For instance, in one or more embodiments, a further artificial intelligence (AI) engine can receive the classified or categorized electronic document to use and/or process the electronic document further, such as, for instance, to extract one or more types of data from the document based on the classified document type, to store the document in a particular category of storage based on the classified document type, and/or to take one or more other actions based on the particular downstream computer process and the classified document type, etc.

Note that although various code or sub-modules are described herein, document classify code, such as disclosed, can use, or include, additional, fewer, and/or different code/sub-modules. A particular code can include additional code, including code of other sub-modules, or less code. Further, additional and/or fewer code/sub-modules can be used. Many variations are possible.

In one or more embodiments, the document classify code is used, in accordance with one or more aspects of the present disclosure, to perform document classify processing. By way of example, FIGS. 3A-3C depict embodiments of different aspects of document classify processing 300, such as disclosed herein. The process is executed, in one or more embodiments, by one or more computers (e.g. computer 101 (FIG. 1), one or more artificial intelligence (AI) systems (e.g., artificial intelligence system 401 (FIG. 4)), and/or one or more processor sets, such as a processor or processing circuitry (e.g., of processor set 110 of FIG. 1). In one example, code or instructions implementing the processing, are part of a code or module, such as document classify code 200 of FIGS. 1-2C. In other examples, the code can be included in one or more other modules and/or one or more other sub-modules of the one or more modules. Various options are available.

In one or more embodiments, document classify processing 300 (FIG. 3A) executes on one or more computers (e.g., computer 101 of FIG. 1, artificial intelligence (AI) system 401 (FIG. 4), and/or one or more processor sets (e.g., processor set 110 of FIG. 1, such as a processor or processing circuitry of the processor set) and performs processing such as disclosed herein, which includes, in one or more aspects, obtaining document feature descriptions 302, or one or more specified electronic feature descriptions, for each document type of one or more document types. In one or more embodiments, the specified feature descriptions are provided, for instance, by a user or using entity of the artificial intelligence system document classify process, and/or are generated by the artificial intelligence system from scanning the particular electronic document type, identifying layout features of the particular electronic document type, selecting one or more layout features of the particular document type (such as one or more significant or unique layout features of the particular document type), and generating respective electronic feature descriptions for the selected one or more features of the electronic document type, such as disclosed herein. Note also that, once obtained, the specified document feature descriptions can be stored and reused for other iterations of the document classify processing. In one or more embodiments, based on obtained results of the classification process, and/or obtained results of one or more computer processes initiated, facilitated or accelerated by the classification process, one or more of the specified document feature descriptions can be adjusted, modified, updated, expanded upon, etc., by, for instance, the user or the system to enhance future results of the document classify processing and/or the one or more computer processes.

As illustrated, in one or more embodiments, document classify processing 300 further includes assigning weights to the described layout features of a particular document type 304, one embodiment of which is depicted in FIG. 3B. As illustrated in FIG. 3B, assigning weights to layout features of a particular document type 304 includes, in one embodiment, data analyzing the obtained document feature descriptions for the particular document type to ascertain layout features 320, which can include data analyzing the specified electronic feature descriptions for the particular document type to ascertain document type features, such as document type layout features. Further, assigning weights to layout features of a particular document type 304 includes, in one or more embodiments, assigning weights to the ascertained layout features of the particular document type 322. For instance, in one or more embodiments, the user and/or system assigns weights to the ascertained layout features of the particular document type based, for instance, on significance or importance of a layout feature to the particular document type, such as uniqueness of the layout feature to the particular document type, frequency of occurrence of the layout feature within the particular document type, etc., such as in term frequency/inverse document frequency (TF/IDF) processing.

As illustrated in FIG. 3A, document classify processing 300 further includes, during runtime, obtaining an unstructured electronic document 306 to undergo document classify processing. In one or more embodiments, obtaining the electronic document can include, for instance, prompting a user to provide the electronic document, and/or receiving the electronic document, retrieving the electronic document, etc. In one or more embodiments, document classify processing 300 further includes scanning, by the artificial intelligence system, the electronic document to generate electronic document layout data 308. In one or more embodiments, as used herein, the document layout refers to the arrangement and organization of document elements such as placement of text, images, graphics, tables, barcodes, icons, check boxes, watermarks, etc. By way of specific example, the document layout, or layout features of the electronic document, can include, for instance, document: topography, images and graphics, colors, spacing, columns and rows of tables, a heading and any subheadings, page orientation, page size, etc.

In one or more embodiments, document classify processing 300 further includes identifying, via artificial intelligence system data analysis of the electronic document layout data, document layout features of the electronic document 310, and selecting, by the artificial intelligence system based on layout features of a particular document type, one or more document layout features of the identified document layout features of the electronic document 312. For instance, in one or more embodiments, selecting the document layout features can be based on obtained assigned weights of the layout features of the particular document type, as well as based on a specified weight threshold. Advantageously, by focusing the subsequent document classification processing workflow on the selected one or more document layout features, based on the specified weights of the layout features of the particular document type, and the specified weight threshold, the more significant, important and/or unique layout features can be selected for further processing, thereby reducing processing overhead within the computing environment by not further processing less significant features of the particular document type for the process of classifying the electronic document. As noted, in one or more embodiments, the specified weight threshold can be system adjustable and/or user-adjustable, for instance, based on the obtained results of the classification process and/or the results of one or more computer processes facilitated or accelerated by the classification process.

In one or more embodiments, document classify processing 300 further includes generating, by the artificial intelligence system, respective electronic feature descriptions for the one or more selected document layout features 314. For instance, in one or more embodiments, respective unstructured electronic feature descriptions are generated by the artificial intelligence system for the one or more selected document layout features, such as, for instance, via natural language processing (NLP) and/or large language model (LLM) processing. In one or more embodiments, the generating process generates respective electronic natural language feature descriptions of the selected one or more document layout features.

As illustrated in FIG. 3A, document classify processing 300 further includes classifying the electronic document based on the generated electronic feature descriptions 316. In one or more embodiments, the classifying includes classifying the electronic document as the particular document type based on exceeding a matching threshold with comparison of the generated respective electronic feature descriptions to the obtained one or more specified electronic feature descriptions for the particular document type. FIG. 3C depicts an embodiment of the classifying electronic document based on electronic feature descriptions processing 316. As illustrated, in one or more embodiments, classifying the electronic document based on electronic feature descriptions 316 includes comparing, for instance, via natural language processing and/or large language model processing, the generated and obtained electronic document feature descriptions 330. For instance, in one or more embodiments, term frequency/inverse document frequency (TF/IDF) can be used to convert the textual descriptions into numerical format (TF/IDF matrix), that can then be used to determine cosine similarity, which is a measure of similarity between the compared descriptions. Further, in one or more embodiments, classifying the electronic document based on electronic feature descriptions 316 further includes classifying the electronic document as the particular document type where the comparison exceeds a set matching threshold 332, for example, 70% of the respective feature descriptions match. In one or more embodiments, the matching threshold can be preset and/or predefined, and can be system-adjustable and/or user-adjustable, for instance, based on obtained results of the classification process and/or obtained results of the one or more computer processes accelerated or facilitated by classifying the electronic document. In one or more embodiments, classifying the electronic document based on electronic feature descriptions processing 316 further includes repeating the selecting, the generating and the classifying for another document type where the comparison is lower than the matching threshold 334, that is, where the comparison of the respective electronic feature descriptions to the one or more specified electronic feature descriptions for the particular document type does not exceed the matching threshold. Note that, in this regard, the classifying, by the artificial intelligence system, the electronic document as the other document type is based on exceeding the matching threshold with comparison of other generated respective electronic feature descriptions, for one or more other selected document layout features, to the obtained one or more other specified electronic feature descriptions of the other document type.

As illustrated in FIG. 3A, in one or more embodiments, document classify processing 300 further includes using, providing, etc., the classified electronic document in enhancing, facilitating or accelerating, one or more computer processes 318. For instance, in one or more embodiments, the resultant classified electronic document is provided to one or more computer processes as input, such as one or more downstream computer processes, where classification of the electronic document accelerates or facilitates the subsequent computer process. For example, in one or more embodiments, a computer system such as with a further artificial intelligence (AI) engine, can receive the classified or categorized electronic document to use and/or to process the document further, such as, for instance, to extract one or more types of data from the classified electronic document, to store the classified electronic document in a particular electronic storage category, and/or to take one or more other actions based on the particular downstream computer process implementation and the obtained classification of the electronic document. In this manner, the document classify code and processing disclosed accelerates subsequent decision making processes by the same computer system or a different computer system, and provides more efficient processing of electronic documents.

Figure 4:
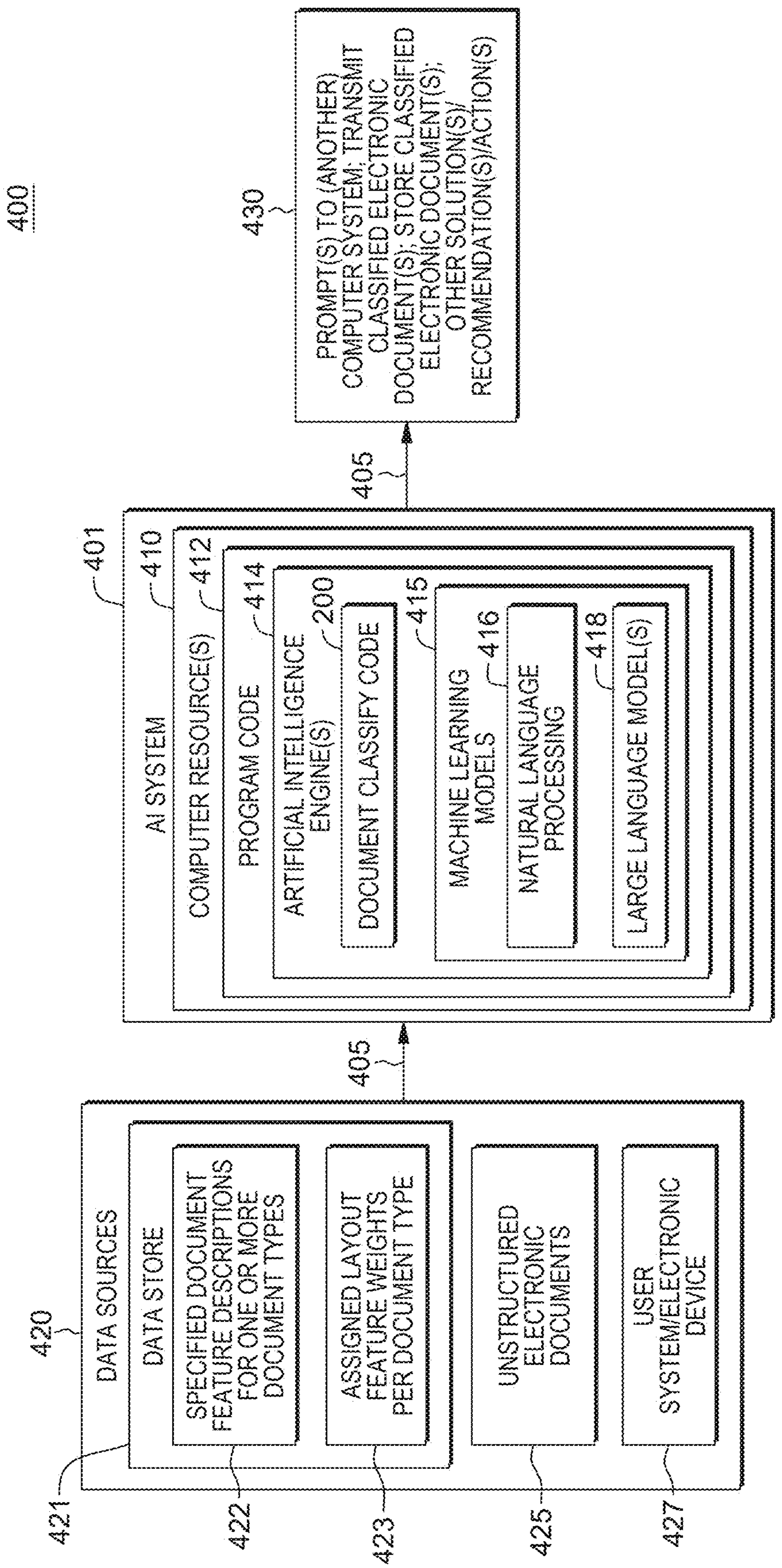
FIG. 4 depicts another example of a computing environment to include and/or use one or more aspects of the present disclosure.

By way of further example, FIG. 4 depicts another embodiment of a computing environment 400, which can incorporate, use or implement, one or more aspects of an embodiment of the present disclosure. In one or more embodiments, computing environment 400 is implemented as part of or includes, a computing environment such as computing environment 100 described above in connection with FIG. 1. In one or more implementations, computing environment 400 includes an artificial intelligence (AI) system 401 with one or more computer resources 410, such as one or more computers 101 of FIG. 1, connected across a network 405 to receive (e.g., obtain, access, etc.) data from one or more data sources 420, such as an electronic data store 421 containing, for instance, specified document feature descriptions for one or more document types 422 and/or assigned layout feature weights per document type 423 for one or more document types. In one or more embodiments, once specified document feature descriptions are obtained for a particular document type, the descriptions can be stored in data store 421 for used during other iterations of the document classify processing. Similarly, once layout feature weights are assigned per document type, the weights can be stored in data store 421 for other iterations. Note that although depicted in FIG. 4 as part of a separate data source (e.g., as part of a user system), in one or more other embodiments, data store 421 can be associated with, or located within, AI system 401. As noted herein, in one or more embodiments, the stored specified document feature descriptions and/or assigned layout feature weights can be system modifiable and/or user modifiable based, for instance on the obtained results of the classification process and/or results of one or more computer processes facilitated or accelerated by the classification process. In one or more embodiments, data sources 420 can further include a database of unstructured electronic documents 425, which can be part of the data store 421 containing the specified document feature descriptions for the one or more document types, or separate from the same data store. For instance, in one or more embodiments, unstructured electronic documents can be received, across one or more networks 405, from another computing resource of an organization's system in real-time or near real-time an input to the artificial intelligence system 401. Further, in one or more embodiments, data sources 420 can include one or more user systems and/or user electronic devices which can be used, for instance, to provide user specified document feature descriptions for one or more document types, as well as user assigned layout feature weights for one or more document types, and/or the electronic documents to be classified by artificial intelligence system 401, as desired for a particular application.

In embodiments, the one or more computer resources 410 of AI system 401 execute program code 412 that runs or implements, for instance, one or more artificial intelligence engines 414 that execute or include one or more aspects of document classify code 200 and document classify processing 300, such as disclosed herein. In one or more embodiments, document classify code 200 includes, utilizes and/or trains one or more machine learning models 415, which can be part of document classify code 200 or accessed by document classify code 200. In one or more embodiments, machine learning models 415 include, for instance, one or more natural language processing models 416, one or more large language models 418, and/or other machine learning models, such as optical character recognition models to facilitate scanning layout features of the electronic document and/or deep learning models to facilitate scanning of layout features of the electronic document, as well as other machine learning models to (for instance) facilitate extracting or comparing natural language descriptions of layout features of the electronic document to features of a particular document type, etc. In one or more embodiments, artificial intelligence engine 414 facilitates training one or more machine learning model(s) 415, such as to perform one or more aspects of the document classify processing disclosed herein. As discussed, artificial intelligence system 401, and in particular, artificial intelligence engine 414, facilitates or accelerates one or more computer processes by automatically classifying electronic documents, such as disclosed. The automatic classifying includes, for instance, scanning, by the artificial intelligence system, an electronic document to generate electronic document layout data, and identifying, via data analysis of the electronic document layout data, document layout features of the electronic document. Further, as noted, the classifying process includes selecting, by the artificial intelligence system based on layout features of a particular document type, one or more particular document layout features of the identified document layout features of the electronic document for further processing, to thereby reduce subsequent processing overhead within the system. As noted, the classifying includes generating, by the artificial intelligence system, respective electronic feature descriptions for the one or more selected document layout features, and classifying the electronic document as the particular document type based on exceeding a matching threshold with comparison of the respective electronic feature descriptions to one or more specified electronic feature descriptions for the particular document type, such as one or more user-specified electronic feature descriptions for the particular document type. In one or more embodiments, the artificial intelligence system 401, and in particular, the artificial intelligence agent 414, executes one or more machine learning models, such as described herein, to accomplish, for instance, the scanning, the identifying, the selecting, the generating, and/or the classifying of the document classify process, as well as other processes disclosed herein.

In one or more embodiments, artificial intelligence engine 414 executes, or initiates executing, document classify code 200 which includes, or references, one or more machine learning models to implement the above-noted computer processing which can include, for instance, obtaining the specified document feature descriptions for one or more document types 422 and the assigned layout feature weights per document type 423, such as from data store 421 and/or from a user system, as well as obtaining an electronic document from, for instance, a data source, such as from an unstructured electronic documents 425 data source, in one embodiment.

As noted, the artificial intelligence system scans, via one or more machine learning models, the electronic document to generate electronic document layout data, which the artificial intelligence system then data analyzes to identify particular document layout features of the electronic document. Further, in one or more embodiments, the artificial intelligence system selects, based on the layout features of a particular document type under consideration, one or more document layout features of the identified document layout features of the electronic document for further processing. For instance, in one or more embodiments, the most unique, or significant, document layout features of the identified document layout features of the electronic document are identified by the system in comparison to the specified document feature descriptions for the particular document type, and their associated assigned weights. The artificial intelligence engine 414 generates respective electronic feature descriptions for the one or more selected layout features using, for instance, natural language processing and/or large language models to obtain, for instance, unstructured natural language electronic document descriptions, as disclosed herein. Further, in one or more embodiments, the artificial intelligence system classifies the electronic document as the particular document type based on exceeding a matching threshold with comparison of the respective electronic feature descriptions to the one or more specified electronic feature descriptions for the particular document type obtained, for instance, from a user or retrieved by the system, such as from data store 421, as noted. In one or more embodiments, the document classify processing of the artificial intelligence system includes using, providing, etc., the classified electronic document in facilitating, initiating or accelerating one or more computer processes, such as, for instance, transmitting a classified electronic document to one or more other computer resources executing the one or more computer processes, storing the classified electronic document in, for instance, applicable storage based classification, or providing other solutions/recommendations/actions based on the classified electronic document 430.

The other solutions/recommendations/actions can include, for instance, providing one or more prompts to another system such as to facilitate one or more aspects of the document classify processing and/or one or more aspects of the one or more computer processes facilitated or accelerated by the classifying of the electronic document. For instance, in one embodiment, the artificial intelligence system 401 can generate prompts to the user system/electronic device 427 to facilitate user input of the specified document feature descriptions for one or more document types and/or the assigned layout feature weights per document type 423, where the feature descriptions or assigned layout feature weights have not previously been defined by the user, or another user or the system, and stored into a data store, such as data store 421. In one or more other embodiments, artificial intelligence engine 414 can also generate intermediate prompts to, for instance, natural language processing 416 and/or large language model processing 418 either within the artificial intelligence system or external to the artificial intelligence system (in another embodiment) to facilitate performing one or more processes of the document classify processing disclosed.

In one or more implementations, computing environment 400 can include, or utilize, one or more internal and/or external networks 405 for interfacing various aspects of computer resource(s) 410, data source(s) 420, as well as one of or more other controllers, components, systems, etc., receiving a prompt, result, action, instruction etc. 430 of the document classify code 200, and/or artificial intelligence system 401, in a manner that facilitates the improved computer-based system processing disclosed herein. By way of example, the network(s) can be, for instance, a telecommunications network, a local area network (LAN), a wide area network (WAN), such as the Internet, or a combination thereof, and can include wired, wireless, fiber optic connections, etc. The network(s) can include one or more wired and/or wireless networks that are capable of receiving and/or transmitting electronic document-related data, including (for instance) training data for one or more of the machine learning model(s) of, or used by, the artificial intelligence system such as disclosed herein, and an output solution, recommendation, or action of the document classify code 200, and/or artificial intelligence system 401, such discussed herein.

In one or more implementations, computer resource(s) 410 house and/or execute program code 412 configured to perform computer-implemented methods in accordance with one or more aspects of the present disclosure. By way of example, computer resource(s) 410 can be a computing-system-implemented resource(s). Further, for illustrative purposes only, computer resource(s) 410 in FIG. 4 is depicted as being a single computer resource. This is a non-limiting example of an implementation. In one or more other embodiments, computer resource(s) 410, which implements one or more aspects of processing such as discussed herein, can, at least in part, be implemented in multiple separate computer resources or systems, such as one or more computer resources of a cloud-hosting environment, by way of example.

Briefly described, in one embodiment, computer resource(s) 410 can include one or more processor sets with one or more processors, for instance, central processing units (CPUs). Also, the processor set(s) can include functional components used in the integration of program code, such as functional components to fetch program code from locations in memory, such as cache or main memory, decode program code, and execute program code, access memory for instruction execution, and write results of the executed instructions or code. The processor set(s) can also include a register(s) to be used by one or more of the functional components. In one or more embodiments, the computing resource(s) can include memory, input/output, a network interface, and storage, which can include and/or access, one or more other computing resources and/or databases, as required to implement the document classify code processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computer resource(s), or computing system(s) or controller(s), which can implement one or more aspects disclosed are described further herein.

In one or more embodiments, program code 412 includes, executes, accesses, etc., artificial intelligence engine 414, with document classify code 200, and which can train and/or use machine learning models 415 that embody (in part), or are used by, the document classify code 200. The artificial intelligence engine 414 can be (in part) one or more artificial intelligence (AI) agents or AI tools and/or can include, or use, one or more machine learning models that are pre-trained using training data that can include a variety of types of electronic document data, as well as feedback data, etc. In one or more embodiments, program code 412 executing on one or more computer resources 410 applies one or more algorithms of, for instance, the artificial intelligence engine 414 to generate and train the machine learning model(s) 415, which the program code then utilizes to, for instance, implement one or more aspects of document classify code 200. In an initialization or learning stage, program code 412 can train the one or more machine learning models 415 using an obtained training dataset to implement, for instance, one or more aspects of the code, functions and/or tools described herein.

Figure 5:
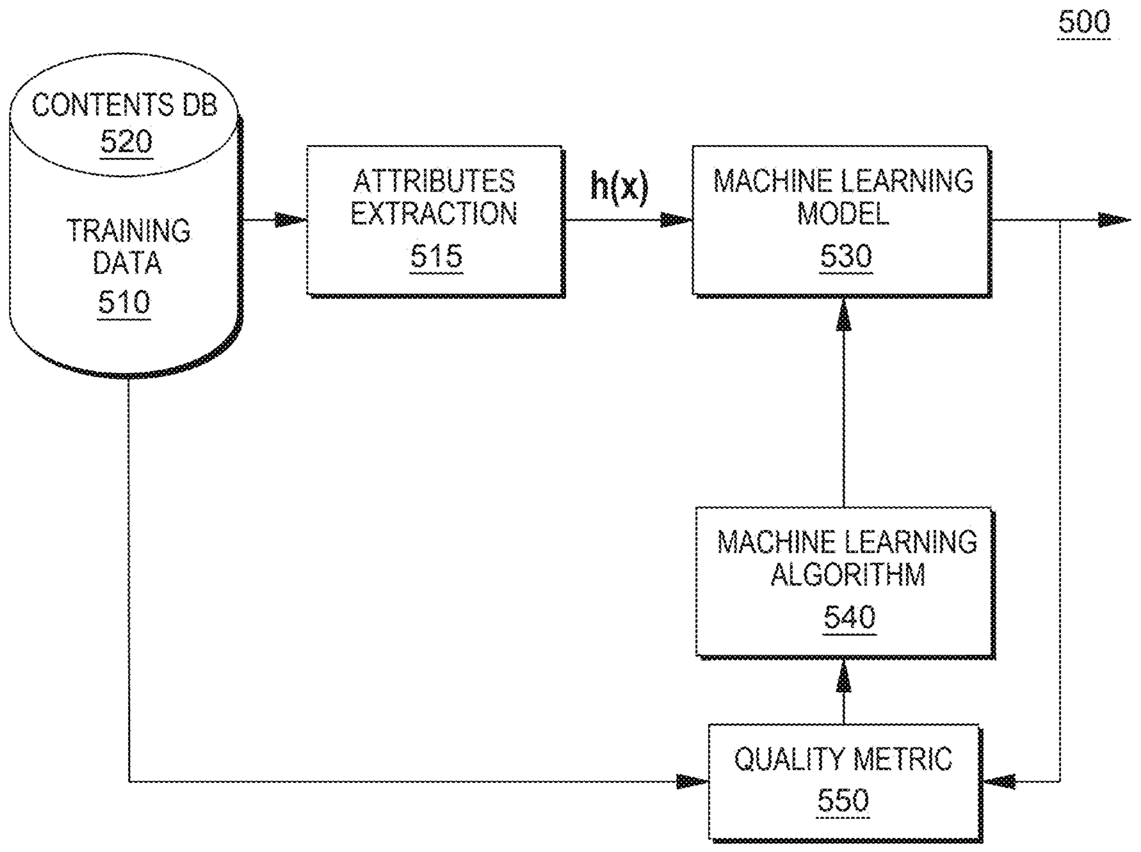
FIG. 5 depicts one example of machine learning model training, in accordance with one or more aspects of the present disclosure.

One example of a machine learning training system is depicted in FIG. 5. In one or more embodiments, a machine learning training system 500 can be utilized to perform cognitive analysis of various inputs, including input data, data from one or more sources, repositories, data structures and/or other data. The data can include document feature descriptions, feature weights, unstructured electronic documents, feedback data, etc., such as described herein. Program code, in embodiments of the present disclosure, can perform data analysis to generate data structures, including algorithms utilized by the program code to implement one or more aspects of the document classify processing and/or initiate (or perform) an action related thereto. As known, machine learning-based modeling solves problems that cannot be solved by numerical means alone. In one example, program code extracts features/attributes 515 from the training data 510, which can be stored in memory or one or more databases 520. The extracted features can be utilized to develop a predictor function, h (x), also referred to as a hypothesis, which the program code utilizes as a model 530.

In identifying various event states, features, attribute similarities, constraints and/or behaviors indicative of states in the ML training data 510, the program code can utilize various techniques to identify attributes in an embodiment of the present disclosure. Embodiments of the present disclosure utilize varying techniques to select attributes (data attributes, elements, patterns, features, constraints, distribution, etc.), including but not limited to, diffusion mapping, principal component analysis, recursive feature elimination (a brute force approach to selecting attributes), and/or a Random Forest, to select the attributes related to various events. The program code may utilize a machine learning algorithm 540 to train the machine learning model(s) 530 (e.g., the algorithms utilized by the program code), including providing weights for the conclusions, so that the program code can train the predictor functions that comprise the machine learning model(s) 530. The conclusions may be evaluated by a quality metric 550. By selecting a diverse set of ML training data 510, the program code trains the machine learning model(s) 530 to identify and weight various attributes (e.g., data attributes, features, patterns, constraints, distributions, etc.) that correlate to various states or events of a process.

The model generated by the program code can be self-learning, since in one or more embodiments, the program code can update the model based on feedback data, such as from, or based on, obtained results of the classification process and/or obtained results of the one or more downstream computer processes facilitated or accelerated by classifying one or more electronic documents, in accordance with the document classification process. For example, when the program code determines that there is a constraint, event, similarity or pattern (e.g., data attribute, record attribute similarity, query pattern, data distribution, search terms distribution, etc.) that was not previously predicted by the model, the program code can utilize a learning agent to update the model to reflect the state of the event, in order to improve predictions in the future. Additionally, when the program code determines that a prediction is incorrect, either based on receiving user feedback through an interface or based on monitoring results of the document classifying process and/or results of the one or more downstream computer processes, the program code can update the model to reflect the inaccuracy of the model results. Program code including a learning agent cognitively analyzes any data deviating from the modeled expectations and adjusts the model to increase the accuracy of the model, moving forward.

In one or more embodiments, the program code can utilize one or more neural networks (NNs) to, for instance, analyze training data and/or collected data to generate an operational machine learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present disclosure, can utilize in implementing a machine learning model, such as described herein.

As noted initially, document system classification is a system process of categorizing documents into predefined classes or categories based on content. There are many techniques used in document classification, including machine learning classification models. However, there are situations where training a machine learning model with sample files is simply not possible, for instance, where documents are confidential documents, or model training would consume too many resources and/or too much time.

Figure 6A:
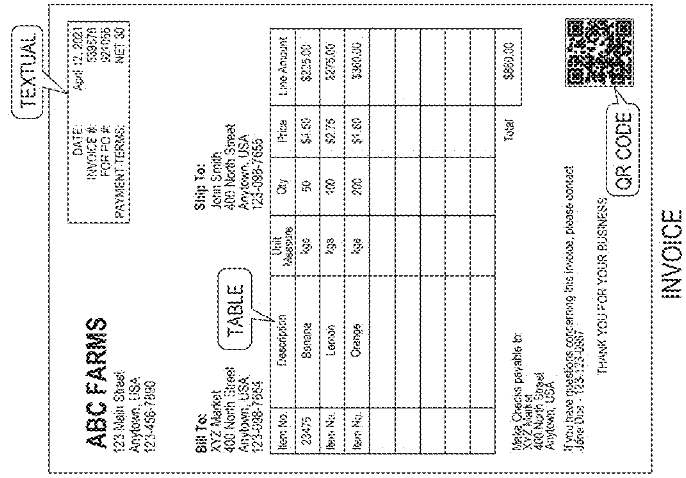
FIGS. 6A-6C depict different exemplary document types which can be electronically described in one embodiment of document classify processing, in accordance with one or more aspects of the present disclosure.
Figure 6B:
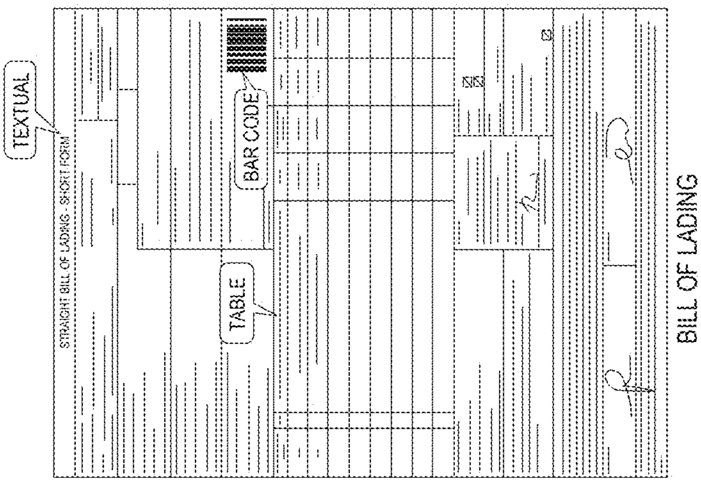
Figure 6C:
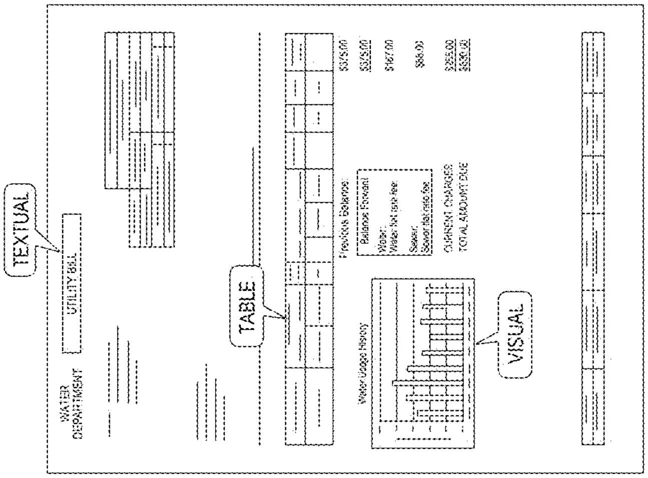
Figure 7:
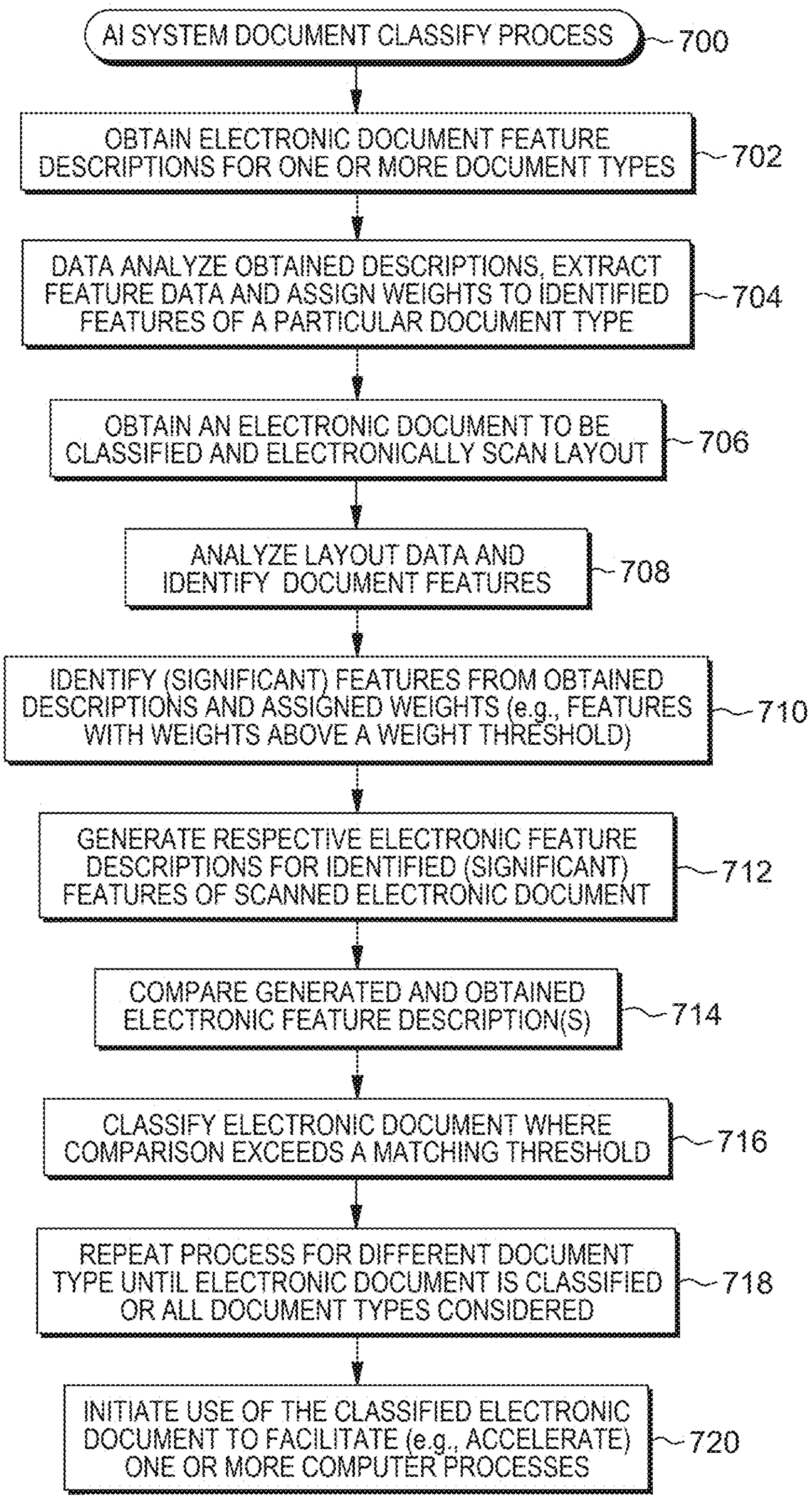
FIG. 7 depicts another embodiment of an artificial intelligence (AI) system document classify process, in accordance with one or more aspects of the present disclosure.

In one or more aspects, disclosed herein are methods, computer program products and computer systems which include artificial intelligence-based document classify code and processing that automatically classifies electronic documents based on natural language descriptions of each document itself, such as based on descriptions of selected document layout features of the electronic document. In one or more embodiments, the document classify processing disclosed facilitates one or more computer processes by automatically classifying, by the artificial intelligence system, electronic documents into one or more electronic document types. As an example, FIG. 6A-6C illustrate exemplary embodiments of three different document types, including an invoice (FIG. 6A), a bill of lading (FIG. 6B) and a utility bill (FIG. 6C), where an electronic document being classified can be any one of the different electronic document types, or another document type not shown. Note that FIG. 6A-6C depict exemplary embodiments only of different document types. The document classify code and processing disclosed herein is applicable to a wide variety of different electronic document types. In another example, the different electronic document types can be, or be based on, different state driver's licenses. Again, a wide variety of different types of electronic document types are possible. Another embodiment of artificial intelligence (AI) system document classify process 700, in accordance with one or more aspects disclosed herein, is shown in FIG. 7. In one or more embodiments, AI system document classify process 700 is the same as, or similar to, the above-described document classify processing of FIGS. 3A-3C.

As illustrated in FIG. 7, AI system document process 700 includes obtaining electronic document feature descriptions for one or more document types 702. In one or more embodiments, obtaining electronic document feature descriptions 702 can include obtaining one or more specified electronic feature descriptions for each document type of one or more document types. In one or more embodiments, the specified feature descriptions are provided, for instance, by a user or using entity of the artificial intelligence system document classify process, and/or are generated by the artificial intelligence system from scanning the particular electronic document type, identifying layout features of the particular document type, selecting one or more layout features of the particular document type (such as one or more significant or unique features of the particular document type), and generating respective electronic feature descriptions for the selected one or more features of the electronic document type, such as disclosed herein. Note also that, once obtained, specified document feature descriptions can be stored and reused for other iterations of the document classify processing. In addition, note that the obtained electronic document feature descriptions can be, or can include, one or more natural language descriptions of one or more features of the particular document type. For instance, in one or more embodiments, the natural language descriptions are text descriptions that describe non-text or layout information of the electronic document. As noted herein, the layout can be, or include, a variety of types of non-text information, including basic information on the entire document, color, number of pages, title, number of forms, watermark information, segmental information including table information, barcode information, icon/image information, check box, etc. The natural language descriptions of a layout feature can be based on the item type, such as table, barcode, icon, check box, watermark, and/or based on the item features, for instance, color, fonts, based on an items absolute or relative position, based on whether the item is showing in the document etc. As one example only, the obtained electronic document feature description can be for an invoice type document: "There is a title at the top of the page, The title font is larger than normal content. There must be a table on the page, and there isn't any chart on the page." Note this generated description example is an unstructured natural language description of one or more layout features of the electronic document type.

Figure 8:
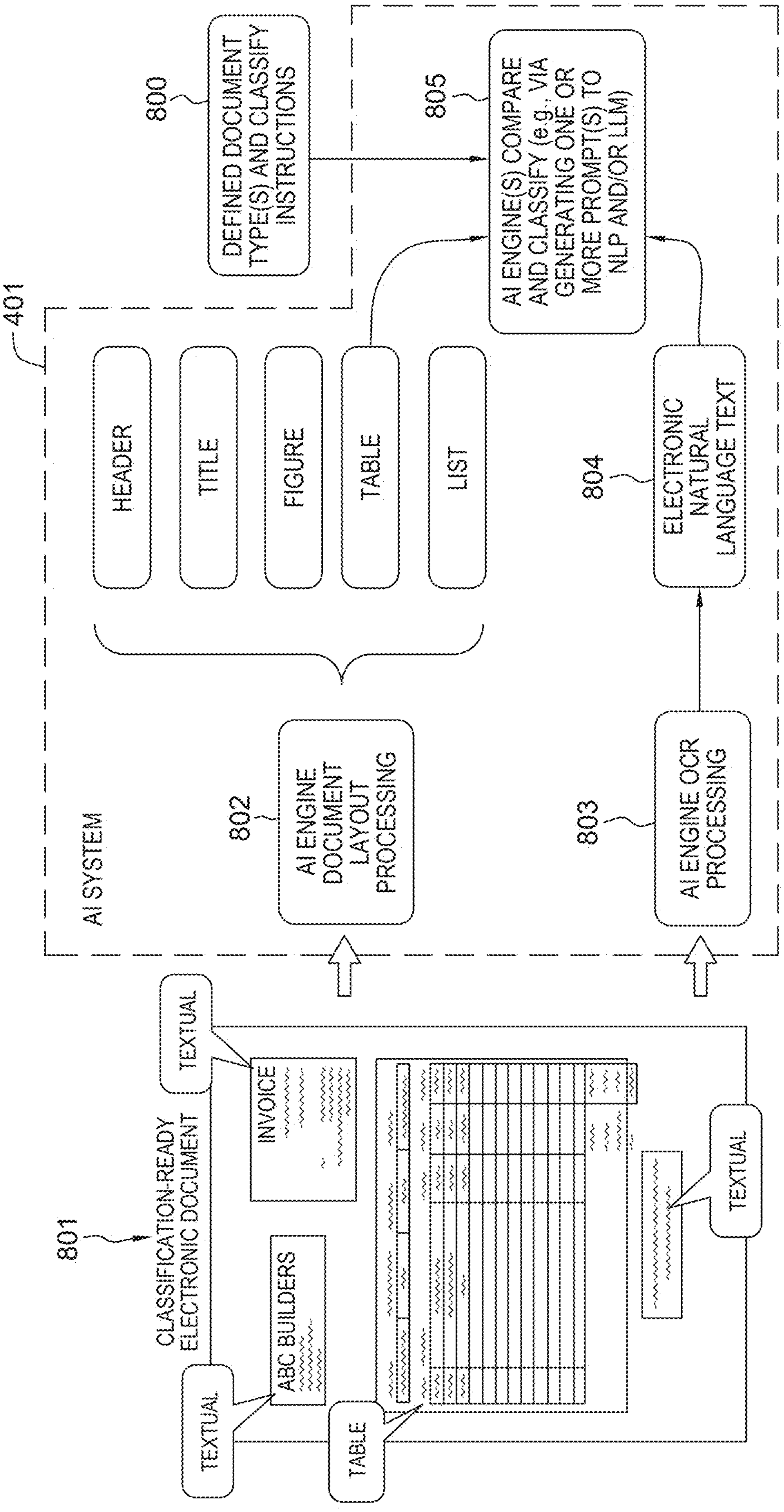
FIG. 8 is a further example of artificial intelligence system document classify processing, in accordance with one or more aspects of the present disclosure.

As illustrated in the further example of artificial intelligence system document classify processing of FIG. 8, the defined document type(s) and classify instructions 800 are provided, in one or more embodiments, to artificial intelligence system 401 as part of the AI system document classify process. In one particular embodiment, the document feature descriptions are user-defined document feature descriptions for each document type of the one or more document types. For instance, in one or more embodiments, in addition to the document feature descriptions being user-defined, feature weights can be user assigned. For instance, the user-defined feature descriptions can include, by way of example only: "for invoice, there must be a table on the first page, and there isn't any icon or barcode on the page. For bill of lighting, there isn't any table . . . ". Based on the user provided feature descriptions, the assigned weights can be either user-generated or system-generated. For instance, if an icon is not mentioned in the user description for a particular document type, then its weight can be zero for that document type. In another example, for a particular electronic document type, a table may be present, and assigned a weight of 10, while a check box is not present, and this assigned a weight of 0. Further, based on the description language provided by the user, weights can be assigned by the system. For instance, there must be a table verses there may be a table can result in different weights. The weight threshold can also be user defined, or system defined. When the weight threshold is high, only the more significant layout features of a particular document type with higher weight values are considered. When the weight threshold is low, all layout features with low assigned weights, medium assigned weights, or high assigned weights are included in the analysis. For instance, based on the information the system can accept, such as the length of a prompt to a NLP model or LLM model, the weight threshold can be adjusted.

As depicted in FIG. 7, and described further herein, in one or more embodiments, weights can be user-assigned or system-assigned. For instance, the system can assign weights to the described layout features of a particular document type by, for instance, data analyzing the obtained or specified document feature descriptions for the particular document type to ascertain layout features and assign weights to the identified layout features of each particular document type based on ascertained significance. For instance, in one or more embodiments, the user and/or system can assign weights to the ascertained layout features of the particular document type based, for instance, on significance or importance of a layout feature to the particular document, such as uniqueness of the layout feature to the particular document type, frequency of occurrence of the layout feature within the particular document type, etc., such as with term frequency/inverse document frequency (TF/IDF) processing. In one or more embodiments, as with the electronic document feature descriptions, the assigned weights can be initially be user-defined for a particular document type, and subsequently stored and reused for subsequent iterations of the document classify processing, as desired.

As illustrated in FIG. 7, AI system document classify processing 700 further includes, during runtime, obtaining an electronic document to be classified, and electronically scanning the layout of the electronic document 706. In one or more embodiments, obtaining the electronic document can include, for instance, prompting a user to provide the electronic document, receiving the electronic document, and/or retrieving the electronic document, etc. Electronically scanning layout of the electronic document can include scanning, by the artificial intelligence system, the electronic document to generate electronic document layout data, such as illustrated in the example of FIG. 8, where the classification-ready electronic document 801 is electronically scanned by AI engine document layout processing 802 of AI system 401 to generate electronic document layout data. Any of a variety of available artificial intelligence tools and/or models can be used to electronically scan layout of the electronic document. In one or more embodiments, the electronic document layout data is data analyzed by the AI engine document layout processing 802 of AI system 401 to identify document layout features of the electronic document 708 (FIG. 7) such as, for instance, header, title, figure, table, list, etc., as illustrated in the example of FIG. 8. As noted, in one or more embodiments, the electronic document layout data can include data for the entire document, such as basic information data of the entire electronic document, including, for instance, color, total number of pages, title, number of forms, watermark information, as well as segmental information data, such as table information data, barcode information data, icon/image data, check box data, etc.

In one or more embodiments, the artificial intelligence system document classify process 700 of FIG. 7 includes identifying features from the obtained descriptions and assigned weights, such as significant layout features with assigned weights above a weight threshold 710. Advantageously, by focusing on one or more selected document layout features based on the assigned weights of the layout features of the particular document type and based on a specified weight threshold, the remaining document classification processing workflow is streamlined. For instance, by focusing the remaining processing on the important and/or unique features selected for a particular document type, processing overhead within the computing environment is reduced by not further processing less distinguishing layout features of the particular document type. As noted, in one or more embodiments, the specified weight threshold can be system-adjustable and/or user-adjustable, for instance, based on the obtained results of the classification process and/or obtained results of one or more computer processes facilitated or accelerated by the classification process.

As illustrated in FIG. 7, in one or more embodiments, AI system document classify process 700 further includes generating respective electronic feature descriptions for selected (e.g., significant) features of the scanned electronic document 712. The descriptions generated can be, in one or more embodiments, natural language descriptions of the one or more selected document layout features of the electronic document. For instance, the layout features can describe an item type, e.g., table, barcode, icon, check box, watermark, etc., as well as be based on item features, e.g., color, font size or type, etc., and/or based on different items absolute or relative positions within the document, and/or based on if showing in the document, etc. As noted, in one or more embodiments, significant layout features can have respective electronic feature descriptions generated during the process. When the weight threshold is high, respective electronic feature descriptions are generated for only selected document layout features with high assigned weights, and when the threshold is low, layout features with lower assigned weights can also have respective electronic feature descriptions generated. The particular threshold can be based, in one or more embodiments, on the electronic description size that the artificial intelligence system can process, such as the length of a particular prompt, such as a compare prompt, description prompt, etc., for a particular AI model implementation. An example of this is depicted in FIG. 8, where artificial intelligence (AI) engine executes an optical character reader (OCR) model to scan the electronic document 803 and generate electronic natural language text 804, as the respective electronic feature descriptions for the one or more selected document layout features. For instance, in one or more embodiments, respective unstructured electronic feature text descriptions are generated by the artificial intelligence system for the one or more selected document layout features, such as, for instance, via natural language processing (NLP) and/or large language model (LLM) processing, as disclosed herein.

As illustrated in FIG. 7, in one or more embodiments, the AI system document classify process 700 further includes classifying the electronic document based on comparing 714 the generated electronic feature descriptions to the one or more specified electronic feature descriptions, such as the defined document type(s) 800 of FIG. 8. The electronic document is classified as the particular document type where the similarity comparison exceeds a matching threshold 716. For instance, the comparing includes comparing, via nature language processing and/or large language model processing, such as the AI engine(s) compare and classify processing 805 of FIG. 8, generated and obtained electronic feature descriptions, where the classifying classifies the document as the particular document type based on the similarity comparison meeting or exceeding the set matching threshold. As noted, the matching threshold can be preset or predefined, and can be system-adjustable and/or user-adjustable, for instance, based on obtained results for the classification process and/or obtained results for one or more computer processes being accelerated by classifying the electronic document.

As illustrated in FIG. 7, in one or more embodiments, AI system document classify process 700 further includes repeating the process for one or more different document types until the document is classified, or all until document types are considered 718. For instance, the selecting, the generating and the classifying for another document type can be repeated where the document description comparison is lower than the matching threshold, that is, where the similarity comparison of the generated respective electronic feature descriptions to the one or more specified electronic feature descriptions for the particular document type does not exceed the matching threshold. Note that, in this regard, the classifying, by the artificial intelligence system, the electronic document as the other document type is based on exceeding the matching threshold with comparison of other generated respective electronic feature descriptions, for one or more other selected document layout features, to the obtained one or more other specified electronic feature descriptions for the other document type.

As illustrated in FIG. 7, in one or more embodiments, AI system document classify process 700 further includes initiating use of the classified electronic document to facilitate or accelerate one or more computer processes 720. For instance, in one or more embodiments, the resultant classified electronic document is provided to one or more subsequent computer processes as input, such as one or more downstream computer processes, where classification of the electronic document accelerates the subsequent computer process. For example, in one or more embodiments, a computer system, such as a further artificial intelligence (AI) engine, can receive the classified or categorized electronic document to use and/or to process the classified document further, such as, for instance, to extract one or more types of data from the document, to store the document in a particular electronic storage category, and/or take one or more other actions based on the particular downstream computer process implementation and the provided classification of the electronic document type.

Figure 9:
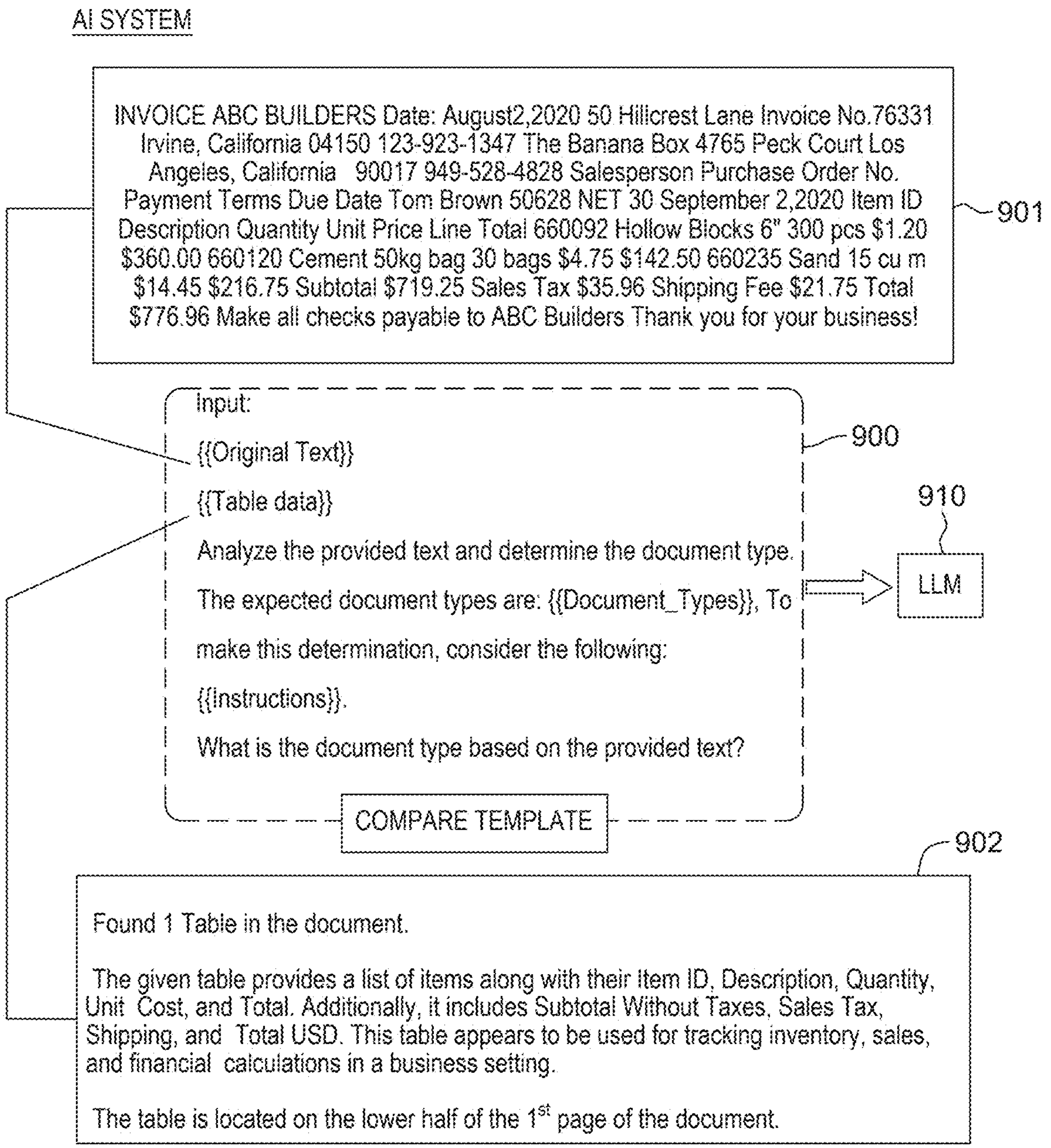
FIG. 9 depicts one embodiment of a compare template for artificial intelligence system document classify processing, in accordance with one or more aspects of the present disclosure.

FIG. 9 depicts one embodiment of a compare template 900 for an artificial intelligence document classify process, in accordance with one or more aspects of the present invention. The compare template 900 of FIG. 9 depicts one embodiment only for providing the generated respective electronic feature descriptions and the specified electronic feature descriptions to an artificial intelligence-based model, such as a large language model, for similarity comparison of layout feature descriptions to, for instance, ascertain whether the descriptions exceed a matching threshold indicative of the electronic document being of the particular document type for which the one or more specified electronic feature descriptions are provided. In the embodiment of FIG. 9, the compare template 900 is shown to include, by way of example, the original text 901 of the electronic document, as well as a natural language description 902 of a table found in the electronic document. In addition, the excepted document types are indicated as part of the compare template 900, where the types are identified, for instance, by the respective specified electronic feature descriptions of features of different document types received or generated.

Figure 10A:
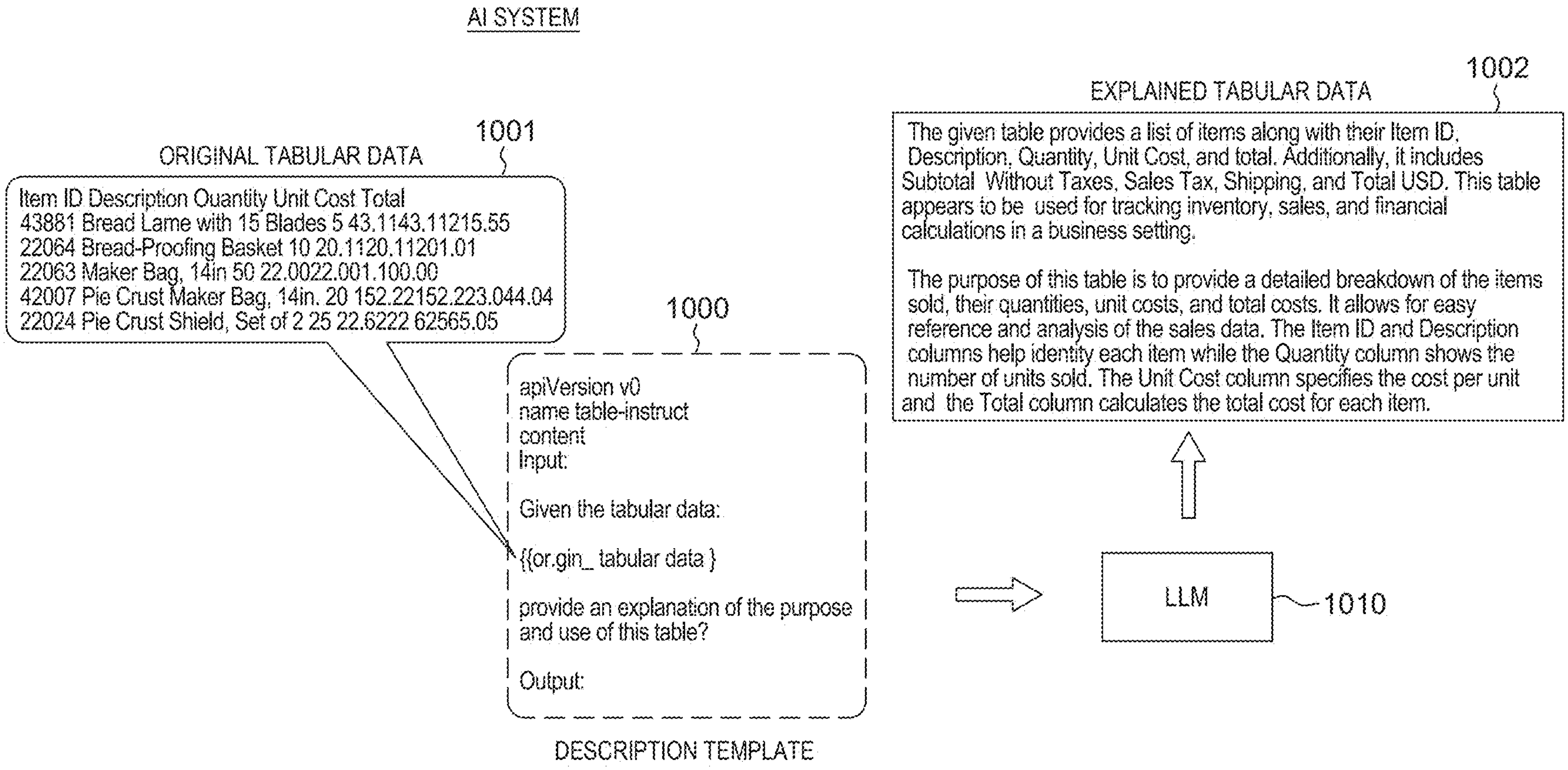
FIGS. 10A & 10B depict embodiments of description templates for artificial intelligence system document classify processing, in accordance with one or more aspects of the present disclosure.
Figure 10B:
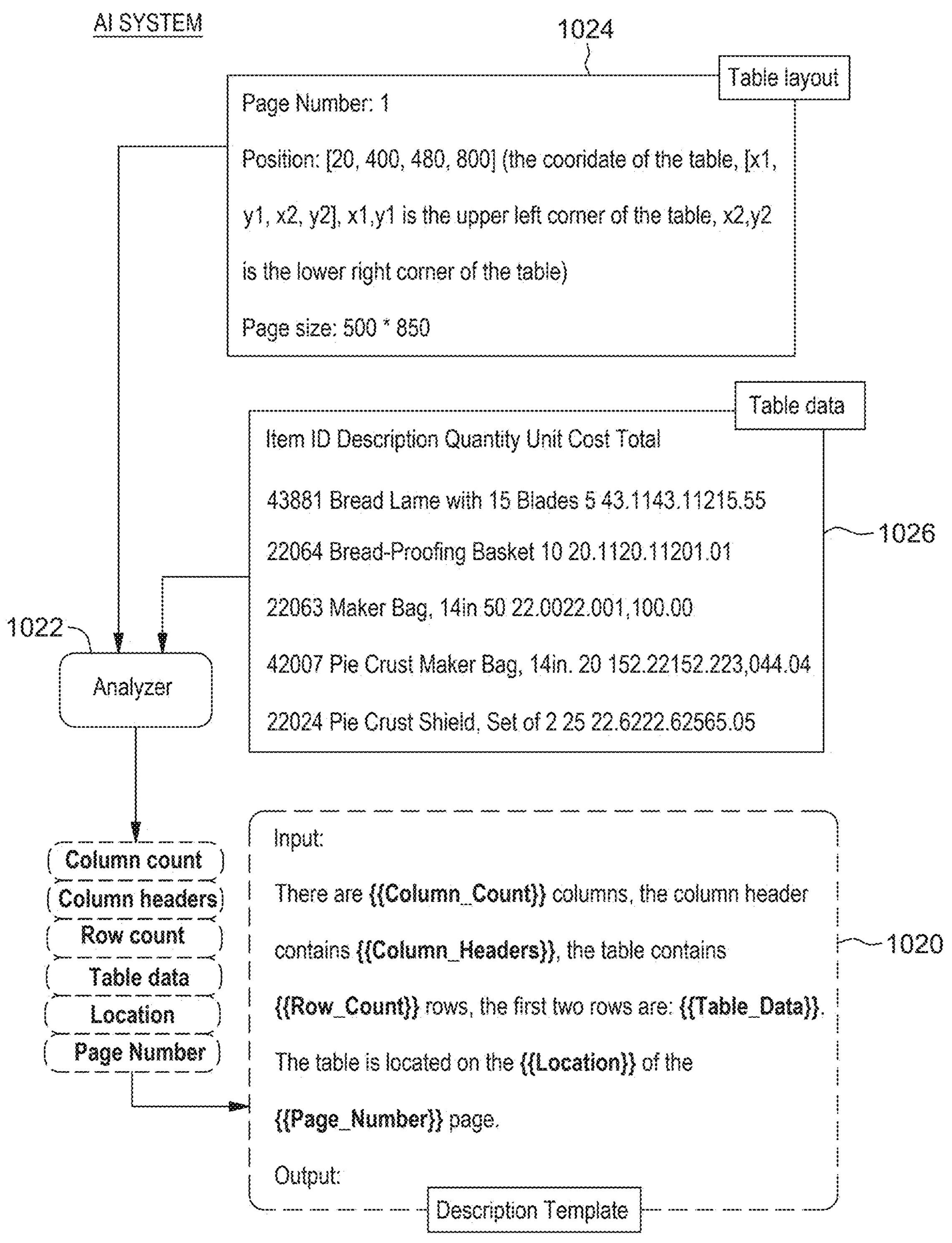

FIGS. 10A & 10B depict different embodiments of description templates for an artificial intelligence system document classify process, such as described herein. As illustrated in FIG. 10A, in one embodiment, a description template 1000 can receive original tabular data 1001 and provide an inquiry to the large language model (LLM) processing 1010 to generate the respective electronic feature descriptions 1002, such as a respective natural language feature description of the table based on the tabular data. As disclosed, the generated respective electronic feature descriptions of the table can then be used in the similarity comparison of the generated data to the one or more user-specified electronic feature descriptions for the particular document type.

FIG. 10B depicts another example of a description template 1020, which can be used or implemented as part of an artificial intelligence system document classify process, such as disclosed herein. In FIG. 10B another example is presented of the artificial intelligence system generating the respective electronic feature descriptions of, for instance, a table in an electronic document. As shown, the artificial intelligence system identifies, via data analysis of the electronic layout data, document layout features of the electronic document. For instance, in one embodiment, the data analyzer 1022 of the artificial intelligence system receives table layout feature data 1024 and the actual table data 1026 and extracts therefrom, in one embodiment, a column count, column headers, row count, a portion of the table data, location of the table within a page, as well as the page number of the table, as one example. This data is then input via a description template 1020, to the large language model processing, and the desired respective electronic feature description, of the table is generated, in one or more embodiments. For instance, based on the illustrated table layout, table data and template, a description such as follows can be generated by the system:

One table is found.

There are five columns, the column header contains Item ID, Description, Quantity, Unit Cost, Total, the table contains 5 rows, the first two rows are:

43881 Bread Lame with 15 Blades 5 43.1143.11215.55

22064 Bread-Proofing Basket 10 20.1120.11201.01.

The table is located on the lower half of the first page.

In one or more embodiments, the lower half can be calculated through the page size and position of the table relative to the page.

Figure 11A:
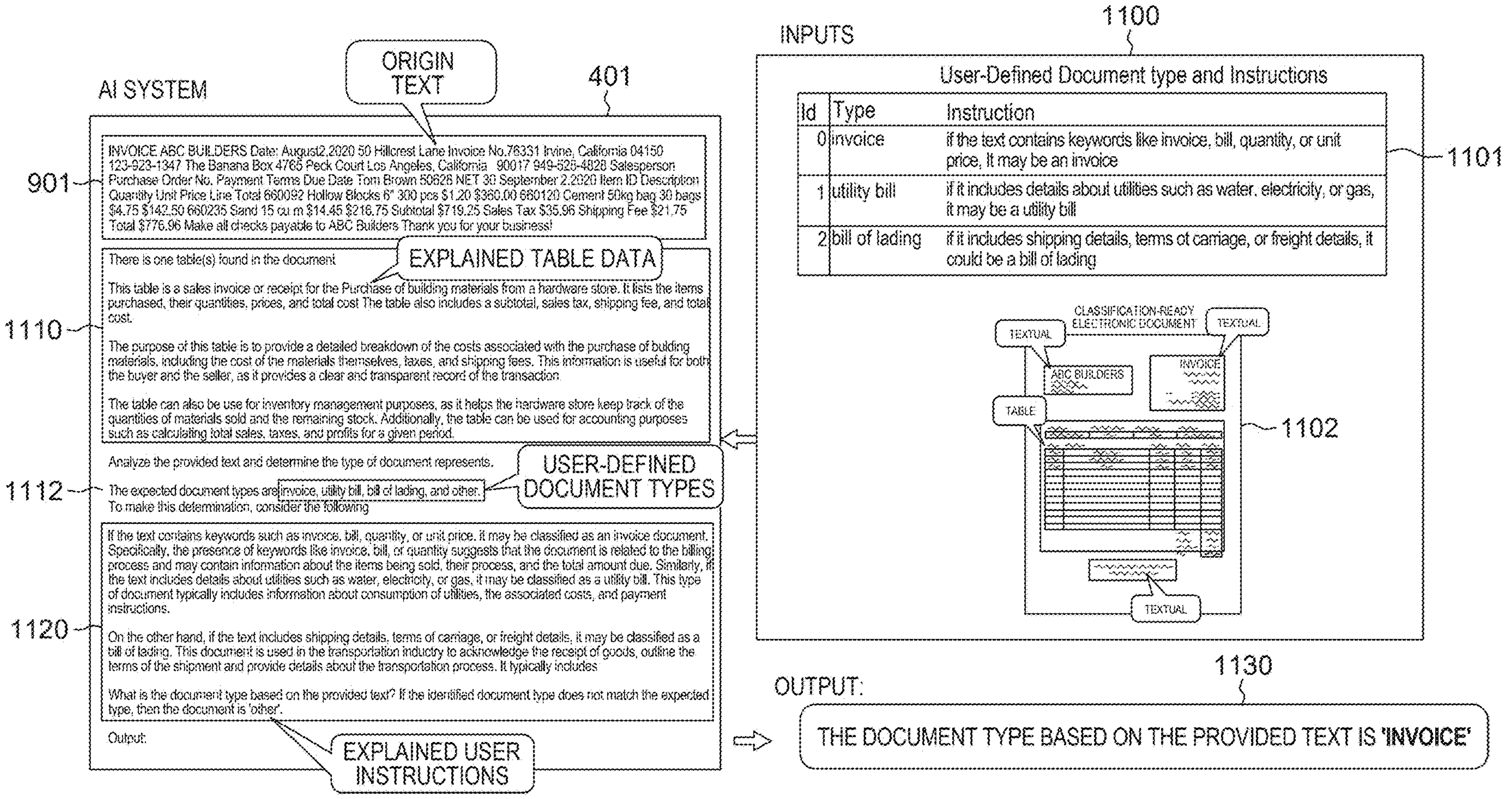
FIGS. 11A & 11B depict further examples of artificial intelligence system document classify processing, in accordance with one or more aspects of the present disclosure.
Figure 11B:
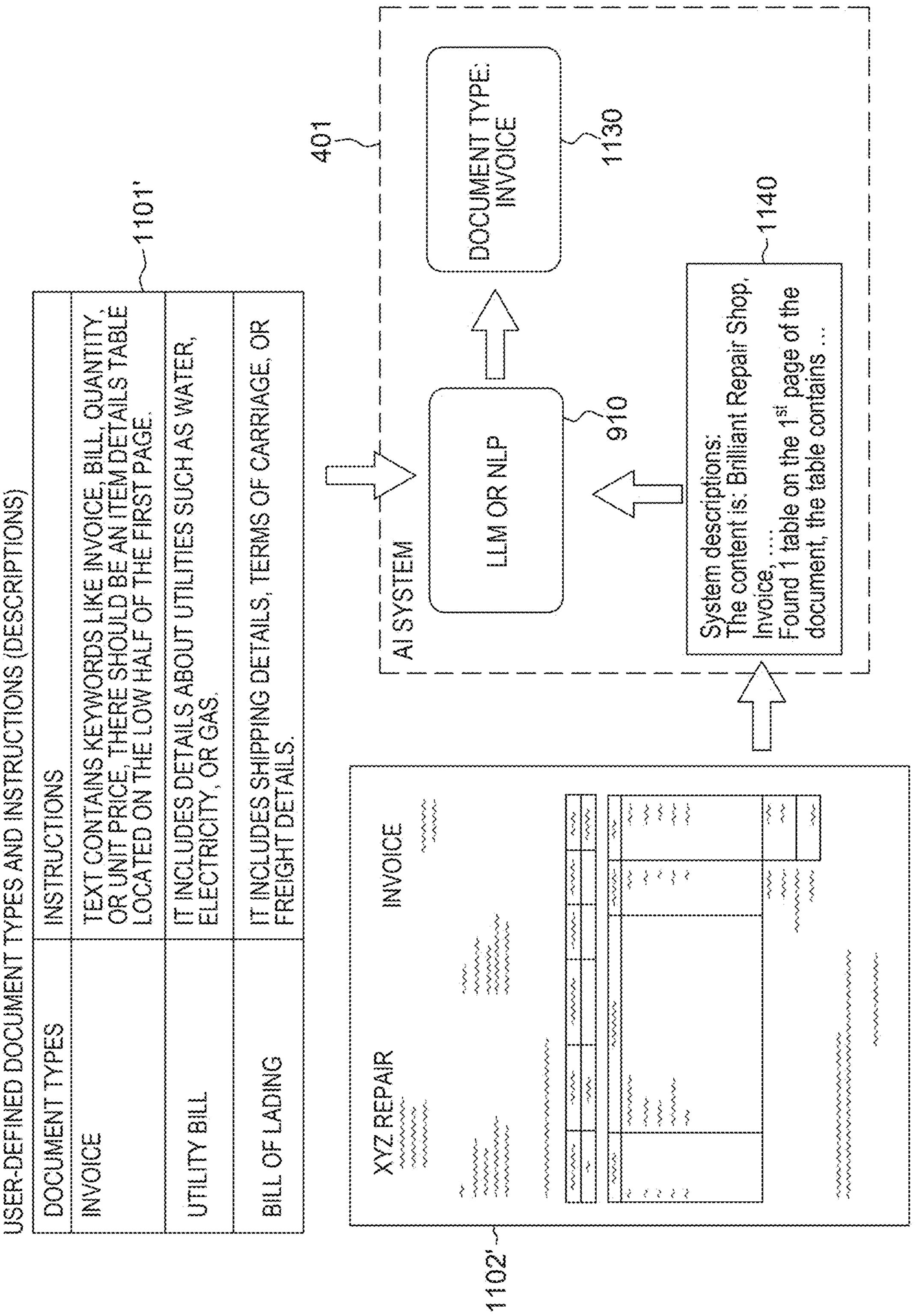

FIGS. 11A & 11B depict further examples of artificial intelligence system document classify processing, in accordance with one or more aspects of present disclosure. As illustrated in FIG. 11A, in one embodiment, inputs 1100 to AI system 401 include, for instance, one or more classification ready electronic documents 1102 and one or more user-defined document types and instructions 1101. As disclosed herein, in one or more embodiments, the user-defined document types have associated therewith one or more specified electronic feature descriptions specified in plain text or natural language. Artificial intelligence document classify system 401 scans the original text of the electronic document 901 and generates respective electronic feature descriptions 1110 explaining, for instance, the table. Further, the AI document classify system receives as input the user-defined document types 1112 and user-defined instructions with specified electronic feature descriptions 1120. As disclosed, in one or more embodiments, the artificial intelligence data classify system classifies the electronic document as a particular document type based on exceeding a matching threshold with similarity comparison of the respective electronic feature descriptions 1110 to the one or more specified electronic feature descriptions 1120 for the particular document type. In the example of FIG. 11A, an output 1130 is provided that the document type is an "invoice", by way of example only.

By way of example, another example of artificial intelligence system document classify processing is depicted in FIG. 11B. In this example, AI system 401 receives as input 1101' user-defined document types and instructions (i.e., specified electronic feature descriptions), as well as an electronic document or classification-ready electronic document 1102'. AI document classify system 401 generates respective feature descriptions for one or more selected document layout features 1140 and provides the generated electronic feature descriptions to, for instance, one or more machine learning models, such as one or more large language models (LLMs) or natural language processing (NLP) models 910, which based on a similarity comparison, provide as output an indication whether the electronic document is classified as the particular document type 1130.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:

facilitating one or more computer processes by automatically classifying, by an artificial intelligence system, electronic documents, the classifying comprising for an electronic document of the electronic documents:

scanning, by the artificial intelligence system, the electronic document to generate electronic document layout data;

identifying, via data analysis of the electronic document layout data, document layout features of the electronic document;

automatically selecting, by the artificial intelligence system based on layout features of a particular document type, one or more document layout features of the identified document layout features of the electronic document;

generating, by the artificial intelligence system, respective natural language electronic feature descriptions that describe spatial layout characteristics of the one or more selected document layout features separate from textual content of the electronic document; and classifying, by the artificial intelligence system, the electronic document as the particular document type based on computing a similarity comparison between the generated respective natural language electronic feature descriptions and a set of predefined electronic feature descriptions for the particular document type using a natural language processing similarity metric, wherein classifying the electronic document as the particular document type is based on the similarity comparison exceeding a specified matching threshold.

2. The method of claim 1, further comprising:

obtaining assigned weights for the layout features of the particular document type; and selecting, based on the assigned weights of the layout features of the particular document type and based on a specified weight threshold, the one or more document layout features of the identified document layout features of the electronic document.

3. The method of claim 2, wherein obtaining assigned weights for the layout features of the particular document type comprises assigning a respective weight to a layout feature of the particular document type based, at least in part, on uniqueness of the layout feature to the particular document type.

4. The method of claim 2, wherein obtaining assigned weights for the layout features of the particular document type comprises assigning a respective weight to a layout feature of the particular document type based, at least in part, on frequency of occurrence of the layout feature within the particular document type.

5. The method of claim 1, wherein the generating, by the artificial intelligence system, the respective natural language electronic feature descriptions for the one or more selected document layout features of the electronic document comprises generating, by the artificial intelligence system, respective unstructured natural language electronic feature descriptions for the one or more selected document layout features.

6. The method of claim 1, wherein the classifying further comprises obtaining one or more predefined electronic feature descriptions for each document type of one or more document types, the particular document type being one document type of the one or more document types.

7. The method of claim 6, wherein the one or more predefined electronic feature descriptions comprise one or more respective user-defined electronic feature descriptions for each document type of the one or more document types.

8. The method of claim 1, wherein the particular document type comprises one document type of multiple document types, and wherein the method further comprises repeating the selecting, the generating and the classifying for another document type of the multiple document types where the similarity comparison between the generated respective electronic feature descriptions to the set of predefined electronic feature descriptions for the particular document type does not exceed the specified matching threshold, wherein classifying, by the artificial intelligence system, the electronic document as the other document type is based on exceeding the matching threshold with comparison of other generated respective electronic feature descriptions for one or more other selected document layout features to one or more other predefined electronic feature descriptions of the other document type.

9. A computer program product comprising:

one or more computer readable program storage media; and program instructions stored on the one or more computer readable storage media to perform operations comprising:

facilitating one or more computer processes by automatically classifying, by an artificial intelligence system, electronic documents, the classifying comprising for an electronic document of the electronic documents:

scanning, by the artificial intelligence system, the electronic document to generate electronic document layout data;

identifying, via data analysis of the electronic document layout data, document layout features of the electronic document;

automatically selecting, by the artificial intelligence system based on layout features of a particular document type, one or more document layout features of the identified document layout features of the electronic document;

generating, by the artificial intelligence system, respective natural language electronic feature descriptions that describe spatial layout characteristics of the one or more selected document layout features separate from textual content of the electronic document; and classifying, by the artificial intelligence system, the electronic document as the particular document type based on computing a similarity comparison between the generated respective natural language electronic feature descriptions and a set of predefined electronic feature descriptions for the particular document type using a natural language processing similarity metric, wherein classifying the electronic document as the particular document type is based on the similarity comparison exceeding a specified matching threshold.

10. The computer program product of claim 9, wherein the classifying further comprises:

obtaining assigned weights for the layout features of the particular document type; and selecting, based on the assigned weights of the layout features of the particular document type and based on a specified weight threshold, the one or more document layout features of the identified document layout features of the electronic document.

11. The computer program product of claim 9, wherein the generating, by the artificial intelligence system, the respective natural language electronic feature descriptions for the one or more selected document layout features of the electronic document comprises generating, by the artificial intelligence system, respective unstructured natural language electronic feature descriptions for the one or more selected document layout features.

12. The computer program product of claim 9, wherein the classifying further comprises obtaining one or more predefined electronic feature descriptions for each document type of one or more document types, the particular document type being one document type of the one or more document types.

13. The computer program product of claim 12, wherein the one or more predefined electronic feature descriptions comprise one or more respective user-defined electronic feature descriptions for each document type of the one or more document types.

14. The computer program product of claim 9, wherein the particular document type comprises one document type of multiple document types, and wherein the operations further comprise repeating the selecting, the generating and the classifying for another document type of the multiple document types where the similarity comparison between the generated respective electronic feature descriptions to the set of predefined electronic feature descriptions for the particular document type does not exceed the specified matching threshold, wherein classifying, by the artificial intelligence system, the electronic document as the other document type is based on exceeding the matching threshold with comparison of other generated respective electronic feature descriptions for one or more other predefined selected document layout features to one or more other specified electronic feature descriptions of the other document type.

15. A computer system comprising:

a processor set;

one or more computer-readable storage media; and program instructions stored on the one or more computer-readable storage media to cause the processor set to perform operations comprising:

facilitating one or more computer processes by automatically classifying, by an artificial intelligence system, electronic documents, the classifying comprising for an electronic document of the electronic documents:

scanning, by the artificial intelligence system, the electronic document to generate electronic document layout data;

identifying, via data analysis of the electronic document layout data, document layout features of the electronic document;

automatically selecting, by the artificial intelligence system based on layout features of a particular document type, one or more document layout features of the identified document layout features of the electronic document;

generating, by the artificial intelligence system, respective natural language electronic feature descriptions that describe spatial layout characteristics of the one or more selected document layout features separate from textual content of the electronic document; and classifying, by the artificial intelligence system, the electronic document as the particular document type based on computing a similarity comparison between the generated respective natural language electronic feature descriptions and a set of predefined electronic feature descriptions for the particular document type using a natural language processing similarity metric, wherein classifying the electronic document as the particular document type is based on the similarity comparison exceeding a specified matching threshold.

16. The computer system of claim 15, wherein the classifying further comprises:

obtaining assigned weights for the layout features of the particular document type; and selecting, based on the assigned weights of the layout features of the particular document type and based on a specified weight threshold, the one or more document layout features of the identified document layout features of the electronic document.

17. The computer system of claim 15, wherein the generating, by the artificial intelligence system, the respective natural language electronic feature descriptions for the one or more selected document layout features of the electronic document comprises generating, by the artificial intelligence system, respective unstructured natural language electronic feature descriptions for the one or more selected document layout features.

* * * * *